(12) United States Patent
Nakano et al.

(10) Patent No.: US 11,898,219 B2
(45) Date of Patent: Feb. 13, 2024

(54) STEEL SHEET

(71) Applicant: NIPPON STEEL CORPORATION, Tokyo (JP)

(72) Inventors: Katsuya Nakano, Tokyo (JP); Kengo Takeda, Tokyo (JP); Hiroyuki Kawata, Tokyo (JP); Akihiro Uenishi, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 180 days.

(21) Appl. No.: 17/604,720

(22) PCT Filed: Jun. 26, 2020

(86) PCT No.: PCT/JP2020/025353
§ 371 (c)(1),
(2) Date: Oct. 18, 2021

(87) PCT Pub. No.: WO2020/262652
PCT Pub. Date: Dec. 30, 2020

(65) Prior Publication Data
US 2022/0195556 A1    Jun. 23, 2022

(30) Foreign Application Priority Data

Jun. 28, 2019 (JP) .................................. 2019-121094

(51) Int. Cl.
| | | |
|---|---|---|
| C22C 38/02 | (2006.01) | |
| C21D 9/46 | (2006.01) | |
| B32B 15/01 | (2006.01) | |
| C21D 6/00 | (2006.01) | |
| C21D 8/02 | (2006.01) | |
| C22C 38/00 | (2006.01) | |
| C22C 38/06 | (2006.01) | |
| C22C 38/08 | (2006.01) | |
| C22C 38/10 | (2006.01) | |
| C22C 38/12 | (2006.01) | |
| C22C 38/14 | (2006.01) | |
| C22C 38/16 | (2006.01) | |
| C22C 38/32 | (2006.01) | |
| C22C 38/38 | (2006.01) | |

(52) U.S. Cl.
CPC .............. *C21D 9/46* (2013.01); *B32B 15/013* (2013.01); *C21D 6/004* (2013.01); *C21D 6/005* (2013.01); *C21D 6/007* (2013.01); *C21D 6/008* (2013.01); *C21D 8/0205* (2013.01); *C21D 8/0226* (2013.01); *C21D 8/0236* (2013.01); *C22C 38/001* (2013.01); *C22C 38/002* (2013.01); *C22C 38/005* (2013.01); *C22C 38/008* (2013.01); *C22C 38/02* (2013.01); *C22C 38/06* (2013.01); *C22C 38/08* (2013.01); *C22C 38/10* (2013.01); *C22C 38/12* (2013.01); *C22C 38/14* (2013.01); *C22C 38/16* (2013.01); *C22C 38/32* (2013.01); *C22C 38/38* (2013.01); *C21D 2211/001* (2013.01); *C21D 2211/008* (2013.01)

(58) Field of Classification Search
None
See application file for complete search history.

(56) References Cited

U.S. PATENT DOCUMENTS

| | | | |
|---|---|---|---|
| 2014/0205855 A1* | 7/2014 | Kawata | C22C 38/22 148/504 |
| 2017/0145535 A1* | 5/2017 | Föjer | B26F 1/38 |
| 2017/0204490 A1 | 7/2017 | Kawasaki et al. | |
| 2018/0171429 A1 | 6/2018 | Suwa et al. | |
| 2019/0218652 A1 | 7/2019 | Haga et al. | |
| 2019/0330721 A1 | 10/2019 | Hayashi et al. | |

FOREIGN PATENT DOCUMENTS

| | | | |
|---|---|---|---|
| WO | WO 2016/021193 A1 | 2/2016 | |
| WO | WO 2016/163468 A1 | 10/2016 | |
| WO | WO 2018/055695 A1 | 3/2018 | |
| WO | WO 2018/073919 A1 | 4/2018 | |

* cited by examiner

*Primary Examiner* — Humera N. Sheikh
*Assistant Examiner* — Kim S. Horger
(74) *Attorney, Agent, or Firm* — Birch, Stewart, Kolasch & Birch, LLP

(57) ABSTRACT

A steel sheet including a steel micro-structure containing, in volume fraction,
tempered martensite: 85% or more, retained austenite: 5% or more to less than 15%, and ferrite, pearlite, bainite, and as-quenched martensite being less than 10% in total, when contents of Mn and C in the retained austenite are denoted by $Mn_A$ and $C_A$, and when contents of Mn and C in a matrix are denoted by $Mn_M$ and $C_M$, respectively, following Formulas (1) to (3) are satisfied, and
the number of carbides having an equivalent circle radius of 0.1 μm or more is 100 or less in a region measuring 20000 μm², and the steel sheet has a tensile strength of 1100 MPa or more. The steel sheet is excellent in crash resistance and formability.

$Mn_A/Mn_M \geq 1.2$ (1)

$C_A/C_M \leq 5.0$ (2)

$C_A \leq 1.0$ (3)

3 Claims, No Drawings

STEEL SHEET

TECHNICAL FIELD

The present invention relates to a steel sheet.

BACKGROUND ART

In order to ensure safety of an automobile at a time of collision and weight reduction, members of an automobile structure are required to establish compatibility between high strength and excellent crash resistance.

Patent Document 1 (WO 2016/021193) discloses an invention relating to a high-strength steel sheet having a predetermined chemical composition; the high-strength steel sheet includes a steel micro-structure containing 59.2% or more to 80% or less of ferrite and bainitic ferrite in total and 3% or more to 20% or less of martensite in area fraction, 10% or more of retained austenite in volume fraction, and 10% or less of a remaining structure in area fraction, the retained austenite has an average grain diameter of 2 μm or less, an average amount of Mn (mass %) in the retained austenite is 1.2 times or more an amount of Mn (mass %) in steel, and the steel sheet includes a steel micro-structure in which an area fraction of retained austenite having an average amount of C (mass %) that is 2.1 times or more of an amount of C (mass %) in the steel accounts for 60% or more of an area fraction of whole retained austenite.

Patent Document 2 (WO 2018/073919) discloses an invention relating to a plated steel sheet having a predetermined chemical composition; the plated steel sheet includes a steel micro-structure containing more than 5.0 volume % of retained austenite and more than 5.0 volume % of tempered martensite, and an amount of C in the retained austenite is 0.85 mass % or more.

LIST OF PRIOR ART DOCUMENTS

Patent Document

Patent Document 1: WO 2016/021193
Patent Document 2: WO 2018/073919

SUMMARY OF INVENTION

Technical Problem

The invention described in Patent Document 1 relates to a steel sheet including a composite steel micro-structure in which retained austenite mainly exerting ductility and martensite exerting strength are dispersed in a steel micro-structure mainly containing ferrite being rich in ductility and soft. The invention according to Patent Document 1 is to cause carbon (C) to concentrate in austenite so as to keep an amount of retained austenite, by performing heat treatment at 820° C. or more to 950° C. or less, namely, in an austenite single-phase region and performing heat treatment at 740° C. or more to 840° C. or more, namely, a ferrite and austenite intercritical region.

However, retained austenite with high concentration of C is a steel micro-structure that is subjected to strain induced transformation to improve formability when a component is worked; however, after being subjected to strain induced transformation to be transformed into martensite, the retained austenite becomes super hard and can serve as a starting point of a fracture, and thus there is a possibility of degrading properties of a member after the component is worked. This may degrade formability of a steel sheet.

Patent Document 2 describes that a step of heating a steel sheet to an $Ac_1$ point or more or an $Ac_3$ point or more, a step of cooling the steel sheet to 500° C. or less, a step of galvanizing the steel sheet, a step of cooling the steel sheet to 300° C. or less, a step of performing thermal refining rolling on the steel sheet, and a step of reheating and holding the steel sheet to and at 200° C. to 600° C. are performed in this order, and Patent Document 2 describes that a plated steel sheet including a steel micro-structure including retained austenite in which C concentrates is obtained by performing a reheating step after the galvanizing.

However, heating a steel sheet to the $Ac_3$ point or more only once before the galvanizing causes coarse carbides to remain in a large quantity, resulting in decrease in limiting hole expansion ratio.

An objective of the present invention is to provide a steel sheet that has high strength (specifically, a tensile strength of 1100 MPa or more) and excellent crash resistance and further has excellent formability.

Solution to Problem

In order to achieve the objective, the present inventors studied how to stabilize retained austenite by causing Mn to concentrate, without depending only on causing C to concentrate. In general, as a transformation induced plasticity (TRIP) steel for which Mn is utilized, a Mn steel that contains about 5 mass % of Mn is known. However, increasing an amount of Mn is disadvantageous from the viewpoint of productivity and weldability.

The present inventors formulated a hypothesis that retained austenite would be stabilized by producing regions in which a concentration of Mn is locally high while restraining an increase in a total amount of Mn contained in a steel sheet (an amount of Mn in a matrix). For example, in order to cause Mn to concentrate in carbides after hot rolling, coiling a hot-rolled steel sheet at high temperature is conceivable. However, carbides in which Mn concentrates are hard to dissolve, are formed to be coarse, and can serve as a starting point of a fracture. It is difficult to dissolve such coarse carbides by normal heat treatment (performing heat treatment once).

Hence, the present inventors conducted intensive studies about how to dissolve carbides in which Mn concentrates and founds a multi-step heat treatment. That is, first heat treatment is performed to form a steel micro-structure that mainly includes as-quenched martensite or tempered martensite. Martensite is a steel micro-structure that contains grain boundaries and dislocations in a large quantity. In grain boundary diffusion in which grain boundaries serve as diffusion paths and in dislocation diffusion in which dislocations serve as diffusion paths, elements diffuse faster than in intraparticle diffusion in which elements diffuse inside grains. Dissolving of carbide is a phenomenon attributable to diffusion of elements; in the multi-step heat treatment, a material is made to include grain boundaries and dislocations in a large quantity after the first heat treatment, and by performing the second heating, grain boundary diffusion and dislocation diffusion tend to occur. Accordingly, carbides are easily dissolved by the multi-step heat treatment. In addition, by the second heat treatment, carbides in which Mn concentrates are dissolved sufficiently. At this time, even after the carbides in which Mn concentrates are dissolved, at least part of Mn remains concentrating at locations at which the carbides are formed because a diffusion velocity of Mn is low as compared with C. As seen from the above, retained austenite tends to be produced in regions in which Mn concentrates. It is thus possible to stabilize retained austenite without increase a concentration of C excessively. That is, it is possible to increase an amount of retained austenite, which is unlikely to serve as a starting point of a fracture even after strain induced transformation. In addition, since carbides are dissolved sufficiently before the multi-step heat treatment, it is also possible to restrain deterioration in crash resistance started from carbides. As a result, a high-strength steel sheet having excellent crash resistance and formability is obtained.

The present invention is made based on such findings, and the gist of the present invention is a steel sheet described below.

A steel sheet including a steel micro-structure containing, in volume fraction, tempered martensite: 85% or more, retained austenite: 5% or more to less than 15%, and ferrite, pearlite, bainite, and as-quenched martensite being less than 10% in total, a chemical composition of the steel sheet consisting of, in mass %:

C: 0.18% or more to 0.38% or less,
Si: 0.80% or more to 2.50% or less,
Mn: 0.6% or more to 5.0% or less,
P: 0.0200% or less,
S: 0.0200% or less,
N: 0.0200% or less,
O: 0.0200% or less,
Al: 0% or more to 1.000% or less,
Cr: 0% or more to 2.0% or less,
Mo: 0% or more to 0.50% or less,
Ti: 0% or more to 0.10% or less,
Nb: 0% or more to 0.10% or less,
B: 0% or more to 0.0100% or less,
V: 0% or more to 0.50% or less,
Cu: 0% or more to 0.50% or less,
W: 0% or more to 0.100% or less,
Ta: 0% or more to 0.100% or less,
Ni: 0% or more to 1.00% or less,
Co: 0% or more to 0.50% or less,
Sn: 0% or more to 0.050% or less,
Sb: 0% or more to 0.050% or less,
As: 0% or more to 0.050% or less,
Mg: 0% or more to 0.050% or less,
Ca: 0% or more to 0.050% or less,
Y: 0% or more to 0.050% or less,
Zr: 0% or more to 0.050% or less,
La: 0% or more to 0.050% or less,
Ce: 0% or more to 0.050% or less, and
the balance: Fe and unavoidable impurities, when a content of Mn and a content of C in the retained austenite are denoted by $Mn_A$ and $C_A$, respectively, and when a content of Mn and a content of C in a matrix are denoted by $Mn_M$ and $C_M$, respectively, following Formulas (1) to (3) are satisfied, and when a region measuring 20000 μm² and centered about a t/4 point (t denotes a thickness of the steel sheet) from a surface of the steel sheet is observed, the number of carbides having an equivalent circle radius of 0.1 μm or more is 100 or less, and the steel sheet has a tensile strength of 1100 MPa or more.

$$Mn_A/Mn_M \geq 1.2 \tag{1}$$

$$C_A/C_M \leq 5.0 \tag{2}$$

$$C_A \leq 1.0 \tag{3}$$

The steel sheet described above may include a galvanized layer, a galvannealed layer, or an electrogalvanized layer on its surface.

Advantageous Effects of Invention

According to the present invention, a steel sheet that has high strength (specifically, a tensile strength of 1100 MPa or more) and excellent crash resistance and further has excellent formability is obtained.

DESCRIPTION OF EMBODIMENTS

An embodiment of the present invention will be described below.

(Steel Micro-Structure)

The steel micro-structure of the steel sheet according to the present embodiment contains, in volume fraction, tempered martensite: 85% or more, retained austenite: 5% or more to less than 15%, and ferrite, pearlite, bainite, and as-quenched martensite being less than 10% in total.

By making the volume fraction of tempered martensite 85% or more, the steel sheet can have sufficient strength. The volume fraction of tempered martensite is preferably 87% or more. Note that, from the viewpoint of restraining deterioration in formability of the steel sheet, the volume fraction of tempered martensite is preferably 95% or less.

Retained austenite contributes to improvement in formability of the steel sheet by its strain induced transformation. To obtain this effect, the volume ratio of retained austenite should be 5% or more.

The balance of the steel micro-structure is at least one or more kinds of ferrite, pearlite, bainite, and as-quenched martensite. With less than 10% of these in total, the deterioration in tensile strength and formability of the steel sheet due to insufficiency of tempered martensite or retained austenite can be restrained.

(Amount of Mn in Retained Austenite)

In the steel sheet according to the present embodiment, when a content of Mn in retained austenite is denoted by $Mn_A$, and a content of Mn in a matrix excluding retained austenite in the steel sheet is denoted by $Mn_M$, "$Mn_A/Mn_M$" is to be 1.2 or more and is preferably 1.5 or more. "$Mn_A/Mn_M$" is considered to be an index indicating concentration of Mn in retained austenite. With "$Mn_A/Mn_M$" of 1.2 or more, the concentration of Mn in retained austenite is considered to be sufficient. Stability of retained austenite with insufficient concentration of Mn may be kept by concentration of C. Retained austenite with excessive concentration of C becomes hard when undergoing strain induced transformation to be transformed into martensite and can serve as a starting point of a fracture.

(Amount of C in Retained Austenite)

In the steel sheet according to the present embodiment, when a content of C in retained austenite is denoted by $C_A$, and a content of C in a matrix excluding retained austenite in the steel sheet is denoted by $C_M$, "$C_A/C_M$" is to be 5.0 or less, and $C_A$ is to be 1.0 or less. When "$C_A/C_M$" is 5.0 or less, and $C_A$ is 1.0 or less, excessive concentration of C in retained austenite is considered to be restrained. Thus, retained austenite that becomes hard when undergoing strain induced transformation to be transformed into martensite and can serve as a starting point of a fracture as described above is considered to be restrained. "$C_A/C_M$" is preferably 4.5 or less. "$C_A/C_M$" has no specific lower limit.

(The number of Carbides)

In the steel sheet according to the present embodiment, when a region measuring 20000 μm$^2$ and centered about a t/4 point (t denotes a thickness of the steel sheet) from a surface of the steel sheet is observed, the number of carbides having an equivalent circle radius of 0.1 μm or more is to be 100 or less. If the number of carbides having an equivalent circle radius of 0.1 μm or more is excessively large, a sufficient hole expandability cannot be kept, and crash resistance deteriorates. For that reason, the number of carbides is to be 100 or less in an area of 20000 μm$^2$. The number is preferably 80 or less and more preferably 70 or less. Still more preferably, the number is 50 or less.

Note that the number of carbides is measured based on an image of a steel micro-structure captured under a scanning electron microscope. Prior to the observation, an observation surface of a sample for steel micro-structure observation is subjected to wet polishing using emery paper and polished with diamond abrasive having an average particle size of 1 μm to a mirror finish, and then its steel micro-structure is etched with saturated picric acid alcoholic solution. A visual field centered about a t/4-sheet-thickness point is observed with a magnification of the observation set at ×5000, where a plurality of randomly selected spots are captured such that a total area of the spots becomes 20000 μm$^2$. The captured image is analyzed with image analysis software typified by WinROOF made by MITANI CORPORATION, and areas of carbides included in a region of 20000 μm$^2$ are measured in detail. With an assumption that each carbide has a circular shape, a radius of each carbide (equivalent circle radius) is determined from the areas determined by the image analysis, and the number of carbides having a radius of 0.1 μm or more is calculated.

(Tensile Strength)

The steel sheet according to the present embodiment has a tensile strength of 1100 MPa or more. The tensile strength of the steel sheet according to the present invention is determined by a tensile test. Specifically, the tensile test is performed in conformance with JIS Z 2241(2011) and using JIS No. 5 test coupons that are taken from the steel sheet in a direction perpendicular to a rolling direction of the steel sheet, and the maximum of measured tensile strengths is determined as the tensile strength of the steel sheet.

(Chemical Composition)

Next, a chemical composition of the steel sheet according to the present embodiment will be described. Note that the symbol "%" for a content of each element means "mass %."

C: 0.18% or More to 0.38% or Less

C (carbon) is an element that keeps a predetermined amount of martensite to improve a strength of the steel sheet. A content of C being 0.18% or more produces the predetermined amount of martensite, makes it easy to increase the strength of the steel sheet to 1100 MPa or more. The content of C is preferably to be 0.22% or more. On the other hand, the content of C is to be 0.38% or less from the viewpoint of restraining embrittlement caused by an excessive increase in the strength of the steel sheet.

Si: 0.80% or More to 2.50% or Less

Si (silicon) is an element acting as a deoxidizer. Si is also an element that influences morphology of carbide and production of retained austenite after heat treatment. Moreover, Si is an element that is useful in increasing strength of the steel sheet through utilization of retained austenite. In order to restrain production of carbide and produce a desired amount of retained austenite to keep workability of the steel sheet, a content of Si is to be 0.80% or more. On the other hand, the content of Si is to be 2.50% or less from the viewpoint of restraining decrease in workability of the steel sheet due to embrittlement of the steel sheet.

Mn: 0.6% or More to 5.0% or Less

Mn (manganese) is an element acting as a deoxidizer. Mn is also an element improving hardenability. In order to obtain tempered martensite sufficiently with Mn, a content of Mn is to be 0.6% or more. On the other hand, the content of Mn is to be 5.0% or less from the viewpoint of restraining formation of coarse Mn oxide, which serves as a starting point of a fracture in press molding.

P: 0.0200% or Less

P (phosphorus) is an impurity element and is an element segregating in a sheet-thickness-center portion of the steel sheet to decrease toughness and embrittling a weld zone. A content of P is preferably as low as possible from the viewpoint of restraining decrease in workability and crash resistance of the steel sheet. Specifically, the content of P is to be 0.0200% or less. The content of P is preferably 0.0100% or less. However, in a case where a content of P of a practical steel sheet is decreased to less than 0.00010%, production costs of the steel sheet significantly increase, which is economically disadvantageous. For that reason, the content of P may be 0.00010% or more.

S: 0.0200% or Less

S (sulfur) is an impurity element and is an element spoiling weldability and spoiling productivity in casting and hot rolling. S is also an element forming coarse MnS to spoil hole expandability. From the viewpoint of restraining decrease in weldability, productivity, and crash resistance, a content of S is preferably as low as possible. Specifically, the content of S is to be 0.0200% or less. The content of S is more preferably 0.0100% or less. However, in a case where a content of S of a practical steel sheet is decreased to less than 0.000010%, production costs of, the steel sheet significantly increase, which is economically disadvantageous. For that reason, the content of S may be 0.000010% or more.

N: 0.0200% or Less

N (nitrogen) is an element forming coarse nitride to degrade formability and crash resistance of the steel sheet and to cause a blowhole to develop during welding. For this reason, a content of N is preferably to be 0.0200% or less.

O: 0.0200% or Less

O (oxygen) is an element forming coarse oxide to degrade formability and crash resistance of the steel sheet and to cause a blowhole to develop during welding. For this reason, a content of 0 is preferably 0.0200% or less.

Al: 0% or More to 1.000% or Less

Al (aluminum) is an element acting as a deoxidizer and is added to the steel sheet when necessary. In order to obtain the effect by making the steel sheet contain Al, a content of Al is preferably 0.02% or more. However, the content of Al is preferably 1.000% or less from the viewpoint of restraining coarse Al oxide from being produced to decrease workability of the steel sheet.

Cr: 0% or More to 2.0% or Less

As with Mn, Cr (chromium) is an element being useful in enhancing strength of the steel sheet by increasing hardenability. Although a content of Cr may be 0%, in order to obtain the effect by making the steel sheet contain Cr, the content of Cr is preferably 0.10% or more. On the other hand, the content of Cr is preferably 2.0% or less from the viewpoint of restraining coarse Cr carbide from being formed to decrease cold formability.

Mo: 0% or More to 0.50% or Less

As with Mn and Cr, Mo (molybdenum) is an element being useful in enhancing strength of the steel sheet. Although a content of Mo may be 0%, in order to obtain the effect by making the steel sheet contain Mo, in order to obtain the effect by making the steel sheet contain Mo, the content of Mo is preferably 0.01% or more. On the other hand, the content of Mo is preferably 0.50% or less from the viewpoint of restraining coarse Mo carbide from being formed to decrease cold workability.

Ti: 0% or More to 0.10% or Less

Ti (titanium) is an element being important in controlling morphology of carbide. Ti can accelerate increasing strength of ferrite. In addition, Ti is an element that is prone to form coarse Ti oxide or TiN, decreasing workability of the steel sheet. Therefore, from the viewpoint of keeping workability of the steel sheet, a content of Ti is preferably as low as possible, preferably to be 0.10% or less, and may be 0%. However, the content of Ti may be 0.001% or more because decreasing the content of Ti to less than 0.001% leads to excessive increase in refining costs.

Nb: 0% or More to 0.10% or Less

As with Ti, Nb (niobium) is an element being useful in controlling morphology of carbide and is also an element being effective at improving toughness of the steel sheet by refining the steel micro-structure. For that reason, Nb may be contained in the steel sheet when necessary. Although a content of Nb may be 0%, in order to obtain the effects, the content of Nb is preferably to be 0.001% or more. However, the content of Nb is preferably 0.10% or less from the viewpoint of restraining fine, hard Nb carbide from precipitating in a large quantity to increase the strength of the steel sheet and degrade ductility of the steel sheet.

B: 0% or More to 0.0100% or Less

B (boron) is an element that restrains ferrite and pearlite from being produced in a cooling process from austenite and accelerates production of a low-temperature transformation structure such as bainite and martensite. In addition, B is an element being beneficial to enhancing strength of the steel sheet. For that reason, B may be contained in the steel sheet when necessary. In a case where B is contained in the steel sheet, a content of B is preferably 0.0001% or more. Note that B being less than 0.0001% requires analysis with meticulous attention to detail for its identification and reaches the lower limit of detection for some analyzing apparatus. On the other hand, the content of B is preferably 0.0100% or less from the viewpoint of restraining production of coarse B nitride, which can serve as a starting point of a void occurring in press molding of the steel sheet.

V: 0% or More to 0.50% or Less

As with Ti and Nb, V (vanadium) is an element being useful in controlling morphology of carbide and is also an element being effective at improving toughness of the steel sheet by refining the steel micro-structure. For that reason, V may be contained in the steel sheet when necessary. In a case where V is contained in the steel sheet, a content of V is preferably 0.001% or more. On the other hand, the content of V is preferably 0.50% or less from the viewpoint of restraining fine V carbide from precipitating in a large quantity to increase the strength of the steel sheet and degrade ductility of the steel sheet.

Cu: 0% or More to 0.50% or Less

Cu (copper) is an element that is useful in improving strength of the steel sheet. Although a content of Cu may be 0%, in order to obtain the effect by making the steel sheet contain Cu, the content of Cu is preferably 0.001% or more. On the other hand, the content of Cu is preferably 0.50% or less from the viewpoint of restraining productivity from being decreased due to hot-shortness in hot rolling.

W: 0% or More to 0.100% or Less

As with Nb and V, W (tungsten) is an element being useful in controlling morphology of carbide and increasing strength of the steel sheet. Although a content of W may be 0%, in order to obtain the effect by making the steel sheet contain W, the content of W is preferably 0.001% or more. On the other hand, the content of W is preferably 0.100% or less from the viewpoint of restraining fine W carbide from precipitating in a large quantity to increase the strength of the steel sheet and degrade ductility of the steel sheet.

Ta: 0% or More to 0.100% or Less

As with Nb, V, and W, Ta (tantalum) is an element being useful in controlling morphology of carbide and increasing strength of the steel sheet. Although a content of Ta may be 0%, in order to obtain the effect by making the steel sheet contain Ta, the content of Ta is preferably 0.001% or more, and more preferably 0.002% or more. On the other hand, the content of Ta is preferably 0.100% or less, and more preferably 0.080% or less from the viewpoint of restraining fine Ta carbide from precipitating in a large quantity to increase the strength of the steel sheet and degrade ductility of the steel sheet.

Ni: 0% or More to 1.00% or Less

Ni (nickel) is an element that is useful in improving strength of the steel sheet. Although a content of Ni may be 0%, in order to obtain the effect by making the steel sheet contain Ni, the content of Ni is preferably 0.001% or more. On the other hand, the content of Ni is preferably 1.00% or less from the viewpoint of restraining decrease in ductility of the steel sheet.

Co: 0% or More to 0.50% or Less

As with Ni, Co (cobalt) is an element that is useful in improving strength of the steel sheet. Although a content of Co may be 0%, in order to obtain the effect by making the steel sheet contain Co, the content of Co is preferably 0.001% or more. On the other hand, the content of Co is preferably 0.50% or less from the viewpoint of restraining decrease in ductility of the steel sheet.

Sn: 0% or More to 0.050% or Less

Sn (tin) is an element that can be contained in the steel sheet in a case where scrap is used as a raw material of the steel. A content of Sn is preferably as low as possible and may be 0%. From the viewpoint of restraining cold formability from being decreased due to embrittlement of ferrite, the content of Sn is preferably 0.050% or less, and more preferably 0.040% or less. However, the content of Sn may be 0.001% or more from the viewpoint of restraining increase in refining costs.

Sb: 0% or More to 0.050% or Less

As with Sn, Sb (antimony) is an element that can be contained in the steel sheet in a case where scrap is used as a raw material of the steel. A content of Sb is preferably as low as possible and may be 0%. From the viewpoint of restraining decrease in cold formability of the steel sheet, the content of Sb is preferably 0.050% or less, and more preferably 0.040% or less. However, the content of Sb may be 0.001% or more from the viewpoint of restraining increase in refining costs.

As: 0% or More to 0.050% or Less

As with Sn and Sb, As (arsenic) is an element that can be contained in the steel sheet in a case where scrap is used as a raw material of the steel. A content of As is preferably as low as possible and may be 0%. From the viewpoint of restraining decrease in cold formability of the steel sheet, the content of As is preferably 0.050% or less, and more preferably 0.040% or less. However, the content of As may be 0.001% or more from the viewpoint of restraining increase in refining costs.

Mg: 0% or More to 0.050% or Less

Mg (magnesium) is an element that controls morphology of sulfide and oxide, contributing to improvement in bending workability of the steel sheet. Although a content of Mg may be 0%, in order to obtain the effect by making the steel sheet contain Mg, the content of Mg is preferably 0.0001% or more, and more preferably 0.0005% or more. On the other hand, from the viewpoint of restraining cold formability from being decreased due to formation of coarse inclusions, the content of Mg is preferably 0.050% or less, and more preferably 0.040% or less.

Ca: 0% or More to 0.050% or Less

As with Mg, Ca (calcium) is an element being, in a trace quantity, capable of controlling morphology of sulfide. Although a content of Ca may be 0%, in order to obtain the effect by making the steel sheet contain Ca, the content of Ca is preferably 0.001% or more. On the other hand, from the viewpoint of restraining cold formability of the steel sheet from being decreased by production of coarse Ca oxide, the content of Ca is preferably 0.050% or less, and more preferably 0.040% or less.

Y: 0% or More to 0.050% or Less

As with Mg and Ca, Y (yttrium) is an element being, in a trace quantity, capable of controlling morphology of sulfide. Although a content of Y may be 0%, in order to obtain the effect by making the steel sheet contain Y, the content of Y is preferably 0.001% or more. On the other hand, from the viewpoint of restraining cold formability of the steel sheet from being decreased by production of coarse Y oxide, the content of Y is preferably 0.050% or less, and more preferably 0.040% or less.

Zr: 0% or More to 0.050% or Less

As with Mg, Ca, and Y, Zr (zirconium) is an element being, in a trace quantity, capable of controlling morphology of sulfide. Although a content of Zr may be 0%, in order to obtain the effect by making the steel sheet contain Zr, the content of Zr is preferably 0.001% or more. On the other hand, from the viewpoint of restraining cold formability of the steel sheet from being decreased by production of coarse Zr oxide, the content of Zr is preferably 0.050% or less, and more preferably 0.040% or less.

La: 0% or More to 0.050% or Less

La (lanthanum) is an element being, in a trace quantity, useful in controlling morphology of sulfide. Although a content of La may be 0%, in order to obtain the effect by making the steel sheet contain La, the content of La is preferably 0.001% or more. On the other hand, from the viewpoint of restraining cold formability of the steel sheet from being decreased by production of coarse La oxide, the content of La is preferably 0.050% or less, and more preferably 0.040% or less.

Ce: 0% or More to 0.050% or Less

As with La, Ce (cerium) is an element being, in a trace quantity, useful in controlling morphology of sulfide. Although a content of Ce may be 0%, in order to obtain the effect by making the steel sheet contain Ce, the content of Ce is preferably 0.001% or more. On the other hand, from the viewpoint of restraining formability of the steel sheet from being decreased by production of Ce oxide, the content of Ce is preferably 0.050% or less, and more preferably 0.040% or less.

The balance of the chemical composition of the steel sheet according to the present embodiment is Fe (iron) and impurities. Examples of the impurities can include elements that are unavoidably contained from row materials of steel or scrap or unavoidably contained in a steel-making process and are allowed to be contained within ranges within which the steel sheet according to the present invention can exert the effects according to the present invention.

(Plated Steel Sheet)

The steel sheet according to the present embodiment may include a plating layer on its surface. The plating layer may be any one of, for example, a galvanized layer, a galvannealed layer, and an electrogalvanized layer.

(Production Method)

Next, a production method of the steel sheet according to the present embodiment will be described. The production method described below is an example of a production method of the steel sheet according to the present embodiment, which is not limited to the method described below.

A cast piece having the chemical composition is produced, and from the obtained cast piece, the steel sheet according to the present embodiment can be produced by the following production method.

"Casting Step"

There are no specific constraints on a method for producing the cast piece from molten steel having the chemical composition; for example, the cast piece may be produced by a typical method such as continuous slab caster and a thin slab caster.

"Hot Rolling Step"

There are no specific constraints on hot rolling conditions, either. For example, in a hot rolling step, it is preferable that the cast piece be first heated to 1100° C. or more and subjected to holding treatment for 20 minutes or more. This is for driving remelting of coarse inclusions. A heating temperature is more preferably 1200° C. or more, and a holding duration is more preferably 25 minutes or more. The heating temperature is preferably 1350° C. or less, and the holding duration is preferably 60 minutes or less.

In the hot rolling step, when the cast piece heated as described above is subjected to hot rolling, it is preferable that the cast piece be subjected to finish rolling in a temperature range of 850° C. or more to 1000° C. or less. A preferable lower limit of the temperature is 860° C., and a preferable upper limit of the temperature is 950° C.

"Coiling Step"

The hot-rolled steel sheet subjected to the finish rolling is coiled into a coil at more than 550° C. to 700° C. or less. This makes it possible to accelerate concentration of alloying elements such as Mn and Cr in carbide that is produced in a coiling step. Setting the coiling temperature at more than 550° C. makes it easy to increase a concentration of Mn in retained austenite after multi-step heat treatment described later is performed. In addition, from the viewpoint of productivity, the coiling temperature is preferably set at 700° C. or less.

When necessary, the hot-rolled steel sheet may be subjected to reheating treatment for softening.

"Pickling Step"

The coiled hot-rolled steel sheet is uncoiled and subjected to pickling. By pickling, oxide scales on surfaces of the hot-rolled steel sheet can be removed, which allows improvement in chemical treatment properties and plating properties of a cold-rolled steel sheet. The pickling may be performed once or may be performed a plurality of times.

"Cold Rolling Step"

The pickled hot-rolled steel sheet is subjected to cold rolling at a rolling reduction of 30% or more to 80% or less. Setting the rolling reduction at 30% or more makes it easy to keep a shape of the steel sheet flat and to restrain decrease in ductility of the finished product. On the other hand, setting the rolling reduction at 80% or less makes it possible to restrain a cold rolling load from becoming excessive, which makes the cold rolling easy. A preferable lower limit of the rolling reduction is 45%, and a preferable upper limit of the rolling reduction is 70%. There are no specific constraints on the number of rolling passes and the rolling reduction in each pass.

"Multi-Step Heat Treatment Step"

After the cold rolling step, the steel sheet according to the present invention is subjected to at least two heat treatments to be produced.

(First Heat Treatment)

In first heat treatment, the steel sheet is first subjected to a heating step in which the steel sheet is heated to a temperature of an $Ac_3$ point or more and is held for 10 seconds or more. Thereafter, a cooling step for cooling the steel sheet is performed under the following condition 1) or 2).

1) The steel sheet is cooled to a temperature range of 25° C. or more to 300° C. or less at an average cooling rate of 20° C./sec or more.
2) The steel sheet is cooled to a cooling stop temperature of 600° C. or more to 750° C. or less at an average cooling rate of 0.5° C./sec or more to less than 20° C./sec (first-stage cooling) and then cooled to a cooling stop temperature of 25° C. or more to 300° C. or less at an average cooling rate of 20° C./sec or more.

Note that the $Ac_3$ point is determined by the following Formula (a). In Formula (a), each symbol of an element indicates a content of the element (mass %). A symbol of an element that is not contained in steel is to be substituted by zero.

$$Ac_3 \text{ point}(°C.)=901-203\times\sqrt{C}-15.2\times Ni+44.7\times Si+104\times V+31.5\times Mo+13.1\times W \quad \text{Formula (a)}$$

By the first heat treatment step, the steel micro-structure of the steel sheet is formed into a steel micro-structure that mainly includes as-quenched martensite or tempered martensite. Martensite is a steel micro-structure that contains grain boundaries and dislocations in a large quantity. In grain boundary diffusion in which grain boundaries serve as diffusion paths and in dislocation diffusion in which dislocations serve as diffusion paths, elements diffuse faster than in intraparticle diffusion in which elements diffuse inside grains. After the first heat treatment, a large number of carbides remain. However, since dissolving of carbide is a phenomenon attributable to diffusion of elements, the more grain boundaries are present, the more easily carbide is dissolved in second heat treatment.

Setting the heating temperature at the $Ac_3$ point or more makes it easy to obtain a sufficient amount of austenite during heating and makes it easy to obtain a sufficient amount of tempered martensite after cooling. Setting the holding duration at 10 seconds or more during heating makes it easy to obtain a sufficient amount of austenite and makes it easy to obtain a sufficient amount of tempered martensite after cooling.

In the cooling step described in 1), setting the average cooling rate at 20° C./sec or more causes sufficient quenching, which makes it easy to obtain martensite. Therefore, after the first heat treatment, this enables dissolving of carbide to sufficiently progress in the second heat treatment to be described later. Setting the cooling stop temperature at 25° C. or more makes it possible to restrain decrease in productivity. Setting the cooling stop temperature at 300° C. or less makes it easy to obtain a sufficient amount of martensite. This enables dissolving of carbide to sufficiently progress in the second heat treatment to be described later.

The cooling step described in 2) is performed, for example, in a case where the steel sheet is rapidly cooled through a slow-cooling zone. In the first-stage cooling, setting the average cooling rate at less than 20° C./sec makes it possible to produce ferrite and pearlite. However, with the chemical composition, ferrite transformation and pearlite transformation are unlikely to occur, which can make it easy to restrain excessive production of ferrite and pearlite. Setting the cooling rate in the first-stage cooling at 20° C./sec or more only leads to the same result as in the case where the cooling step described in 1) is performed, and a material quality of the steel sheet does not necessarily deteriorate. At the same time, setting the average cooling rate in the first-stage cooling at 0.5° C./sec or more restrains excessive progress of the ferrite transformation and the pearlite transformation, which makes it easy to obtain a predetermined amount of martensite.

(Second Heat Treatment)

In the second heat treatment, the steel sheet is first subjected to a heating step in which the steel sheet is reheated to a temperature of the $Ac_3$ point or more and is held for 10 seconds or more to 600 seconds or less. Thereafter, a cooling step for cooling the steel sheet is performed under the following condition 1) or 2).

1) The steel sheet is cooled to a temperature range of 25° C. or more to 300° C. or less at an average cooling rate of 20° C./sec or more.
2) The steel sheet is cooled to a cooling stop temperature of 600° C. or more to 750° C. or less at an average cooling rate of 0.5° C./sec or more to less than 20° C./sec (first-stage cooling) and then cooled to a cooling stop temperature of 25° C. or more to 300° C. or less at an average cooling rate of 20° C./sec or more.

By the first heat treatment step, a steel micro-structure that mainly includes as-quenched martensite or tempered martensite is formed, where elements easily diffuse. By further performing the second heat treatment step, the steel microstructure can be formulated, and coarse carbide in which Mn in the steel sheet concentrates (specifically, carbide having an equivalent circle radius of 0.1 μm or more) can be sufficiently dissolved. At this time, even after the carbides in which Mn concentrates are dissolved, at least part of Mn remains concentrating at locations at which the carbides are formed because a diffusion velocity of Mn is low as compared with C. As seen from the above, retained austenite tends to be produced in regions in which Mn concentrates. It is thus possible to stabilize retained austenite without increase a concentration of C excessively. That is, it is possible to increase an amount of retained austenite, which is unlikely to serve as a starting point of a fracture even after strain induced transformation. In addition, since carbides are dissolved sufficiently before the multi-step heat treatment, it is also possible to restrain deterioration in crash resistance started from carbides. As a result, a high-strength steel sheet having excellent crash resistance and formability is obtained.

Setting the heating temperature at the $Ac_3$ point or more makes it easy to obtain a sufficient amount of austenite during heating and makes it easy to obtain a sufficient amount of tempered martensite after cooling. Setting the holding duration at 10 seconds or more during heating makes it easy to obtain a sufficient amount of austenite and makes it easy to obtain a sufficient amount of tempered martensite after cooling. Setting the holding duration at 600 seconds or less during heating makes it possible to restrain Mn from diffusing to cause regions in which Mn concentrates to disappear after coarse carbides are dissolved. This makes it easy to obtain a desired amount of retained austenite.

In the cooling step described in 1), setting the average cooling rate at 20° C./sec or more causes sufficient quenching, which makes it easy to obtain desired tempered martensite. For that reason, a tensile strength of the steel sheet can be increased to 1100 MPa or more. Setting the cooling stop temperature at 25° C. or more makes it possible to restrain decrease in productivity. Setting the cooling stop temperature at 300° C. or less makes it easy to obtain desired tempered martensite. For that reason, a tensile strength of the steel sheet can be increased to 1100 MPa or more.

The cooling step described in 2) is performed, for example, in a case where the steel sheet is rapidly cooled through a slow-cooling zone. In the first-stage cooling, setting the average cooling rate at less than 20° C./sec makes it possible to produce ferrite and pearlite. However, with the chemical composition, ferrite transformation and pearlite transformation are unlikely to occur, which can make it easy to restrain excessive production of ferrite and pearlite. Setting the cooling rate in the first-stage cooling at 20° C./sec or more only leads to the same result as in the case where the cooling step described in 1) is performed, and a material quality of the steel sheet does not necessarily deteriorate. At the same time, setting the average cooling rate in the first-stage cooling at 0.5° C./sec or more restrains excessive progress of the ferrite transformation and the pearlite transformation, which makes it easy to obtain a predetermined amount of martensite.

Although effects of the multi-step heat treatment step are sufficiently exerted by performing the two heat treatments, three or more heat treatment steps may be performed in total by performing the second heat treatment step a plurality of times after the first heat treatment step.

"Holding Step"

After the cooling in the last heat treatment step in the multi-step heat treatment step, the steel sheet is held in a temperature range of 200° C. or more to 450° C. or less for 10 seconds or more to 600 seconds or less. In this holding step, the steel sheet may be held at a constant temperature or may be heated and cooled in the middle of the step as appropriate. Through this holding step, the as-quenched martensite obtained by the cooling can be tempered, and carbon can be caused to concentrate in retained austenite. Setting the holding temperature at 200° C. or more causes the tempering to progress sufficiently, making it easy to obtain a sufficient amount of tempered martensite. Setting the holding temperature at 450° C. or less makes it possible to restrain the tempering from progressing excessively. Setting the holding duration at 10 seconds or more makes it possible to cause the tempering to progress sufficiently. Setting the holding duration at 600 seconds or less makes it possible to restrain the tempering from progressing excessively.

[Tempering Step]

After the holding step, the steel sheet may be tempered. This tempering step may be a step in which the steel sheet is held or reheated at a predetermined temperature in the middle of cooling to room temperature or may be a step in which the steel sheet is reheated to the predetermined temperature after the cooling to room temperature has been finished. A method for heating the steel sheet in the tempering step is not limited to a specific method. However, from the viewpoint of restraining decrease in the strength of the steel sheet, the holding temperature or the heating temperature in the tempering step is preferably 500° C. or less.

"Plating Step"

The steel sheet may be subjected to plating treatment such as electrolytic plating treatment and deposition plating treatment and may be further subjected to galvannealing treatment after the plating treatment. The steel sheet may be subjected to surface treatment such as formation of an organic coating film, film laminating, treatment with organic salt or inorganic salt, and non-chromium treatment.

In a case where galvanizing treatment is performed on the steel sheet as the plating treatment, the steel sheet is heated or cooled to a temperature of (temperature of galvanizing bath−40° C.) to (temperature of galvanizing bath+50° C.) and immersed in a galvanizing bath. Through the galvanizing treatment, a steel sheet with a galvanized layer on its surface, that is, a galvanized steel sheet is obtained. As the galvanized layer, for example, one having a chemical composition containing Fe: 7 mass % or more to 15 mass % or less, with the balance expressed as: Zn, Al, and impurities can be used. Alternatively, the galvanized layer may be made of a zinc alloy.

In a case where the galvannealing treatment is performed after the galvanizing treatment, the galvanized steel sheet is heated to a temperature of 460° C. or more to 600° C. or less, for example. Setting this heating temperature at 460° C. or more allows the steel sheet to be galvannealed sufficiently. Setting this heating temperature at 600° C. or less makes it possible to restrain the steel sheet from being galvannealed excessively and deteriorating in corrosion resistance. Through such galvannealing treatment, a steel sheet with a galvannealed layer on its surface, that is, a galvannealed steel sheet is obtained.

Example 1

Next, Example of the present invention will be described; however, conditions described in Example are merely an example of conditions that was adopted for confirming feasibility and effects of the present invention, and the present invention is not limited to this example of conditions. In the present invention, various conditions can be adopted as long as the conditions allow the objective of the present invention to be achieved without departing from the gist of the present invention.

Cast pieces having chemical compositions shown in Tables 1 to 4 were subjected to hot rolling under conditions shown in Tables 5 to 8 and then coiled. The resulting hot-rolled steel sheets were subjected to cold rolling under conditions shown in Tables 5 to 8. Subsequently, the resulting cold-rolled steel sheets were subjected to heat treatment under conditions shown in Tables 5 to 8. Some of the steel sheets were plated by a conventional method, and some of the plated steel sheets were subjected to galvannealing treatment by a conventional method. The steel sheets obtained in this manner were subjected to identification of their steel micro-structures and measurement of their amounts of Mn and amounts of C in retained austenite, their tensile strengths, and their crash resistances, by the following methods. The results are shown in Tables 9 to 12. Note that because an amount of Mn and an amount of C in a matrix of a cast piece are substantially the same as those of a chemical composition of the cast piece, the amount of Mn and the amount of C in the chemical composition of the cast piece are regarded as those in the matrix.

In the present invention, identification of steel microstructures and calculation of their volume fractions are performed as follows.

"Ferrite"

First, a sample including a sheet-thickness cross section that is parallel to a rolling direction of a steel sheet is taken, and the cross section is determined as an observation surface. Of the observation surface, a 100 µm×100 µm region centered about a ¼ sheet-thickness point from a surface of the steel sheet is determined as an observation region. An electron channeling contrast image, which is seen by observing this observation region under a scanning electron microscope at 1000 to 50000× magnification, is an image illustrating a difference in crystal orientation between grains in a form of a difference in contrast. In this electron channeling contrast image, an area of a uniform contrast illustrates ferrite. An area fraction of ferrite identified in this manner is then calculated by a point counting procedure (conforming to ASTM E562). The area fraction of ferrite calculated in this manner is regarded as a volume fraction of ferrite.

"Pearlite"

First, the observation surface is etched with Nital reagent. Of the etched observation surface, a 100 µm×100 µm region centered about a ¼ sheet-thickness point from a surface of the steel sheet is determined as an observation region. This observation region is observed under an optical microscope at 1000 to 50000× magnification, and in an observed image, an area of a dark contrast is regarded as pearlite. An area fraction of pearlite identified in this manner is then calculated by the point counting procedure. The area fraction of pearlite calculated in this manner is regarded as a volume fraction of pearlite.

"Bainite and Tempered Martensite"

An observation region obtained by the etching with Nital reagent is observed under a field emission scanning electron microscope (FE-SEM) at 1000 to 50000× magnification. In this observation region, bainite and tempered Martensite are identified from positions and arrangement of cementite grains included inside a steel micro-structure, as follows.

Bainite is present in a state where cementite or retained austenite grains are present in lath bainitic ferrite boundaries and in a state where cementite is present inside lath bainitic ferrite. In a case where cementite or retained austenite grains are present in the lath bainitic ferrite boundaries, the bainitic ferrite boundaries are found, so that bainite can be identified. In a case where cementite is present inside the lath bainitic ferrite, the number of relations in crystal orientation between bainitic ferrite and cementite is one, and cementite grains have the same variant, so that bainite can be identified. An area fraction of bainite identified in this manner is calculated by the point counting procedure. The area fraction of bainite is regarded as a volume fraction of bainite.

In tempered martensite, cementite grains are present inside martensite laths; the number of relations in crystal orientation between martensite laths and cementite is two or more, and cementite has a plurality of variants, so that tempered martensite can be identified. An area fraction of tempered martensite identified in this manner is calculated by the point counting procedure. The area fraction of tempered martensite is regarded as a volume fraction of tempered martensite.

"As-quenched Martensite"

First, an observation surface similar to the observation surface used for the identification of ferrite is etched with LePera reagent, and a region similar to that used for the identification of ferrite is determined as an observation region. In the etching with the LePera reagent, martensite and retained austenite are not etched. For that reason, the observation region etched with the LePera reagent is observed under the FE-SEM, and areas that are not etched are regarded as martensite and retained austenite. Then, a total area fraction of martensite and retained austenite identified in this manner is calculated by the point counting procedure, and the area fraction is regarded as a total volume fraction of martensite and retained austenite.

Next, from the total volume fraction, a volume fraction of retained austenite that is calculated as follows is subtracted, so that a volume fraction of as-quenched martensite can be calculated.

"Retained Austenite"

In the present invention, an area fraction of retained austenite is determined by X-ray measurement as follows. First, a portion of the steel sheet from its surface to ¼ of its sheet thickness is removed by mechanical polishing and chemical polishing. Next, a surface subjected to the chemical polishing is subjected to measurement using MoKα X-ray as a characteristic X-ray. Then, based on an integrated intensity ratio between diffraction peaks of (200) and (211) of a body-centered cubic lattice (bcc) phase and diffraction peaks of (200), (220), and (311) of a face-centered cubic lattice (fcc) phase, an area fraction Sγ of retained austenite is calculated by the following formula. The area fraction Sγ of retained austenite calculated in this manner is regarded as a volume fraction of retained austenite.

$$S\gamma = (I200f + I220f + I311f)/(I200b + I211b) \times 100$$

Here, I200f, I220f, and I311f represent intensities of diffraction peaks of (200), (220), and (311) of an fcc phase, respectively, and I200b and I211b represent intensities of diffraction peaks of (200) and (211) of a bcc phase, respectively.

(Measurement of Amount of Mn in Retained Austenite)

An amount of Mn in retained austenite is measured with an electron probe micro analyzer (EPMA). First, in order to grasp locations of retained austenite in a measurement region, crystal orientation information on an observation region is obtained by electron backscattering diffraction (EBSD). A sample is taken from a steel sheet such that its sheet-thickness cross section parallel to a rolling direction of the steel sheet serves as an observation surface, and the observation surface is subjected to wet polishing using emery paper, polished with diamond abrasive having an average particle size of 1 and then subjected to chemical polishing. In order to determine the observation region, indentations are impressed along a 50×50-µm square centered about a ¼-sheet thickness portion in a Vickers hardness test, and the indentations are used as marks. Next, a field-emission scanning electron microscope (FE-SEM) is used to obtain crystal orientations at intervals of 0.05 µm within a region surrounded by the indentations serving as the marks. At this time, as software for obtaining data on the crystal orientations, software "OIM Data Collection™ (ver.7)" made by TSL solutions K. K. is used. The obtained crystal orientation information is divided into BCC phases and FCC phases by software "OIM Analysis™ (ver.7)" made by TSL solutions K. K. The FCC phases correspond to retained austenite. Next, an EPMA is used to measure the amount of Mn in the retained austenite. An apparatus used for the measurement is JXA-8500F made by JEOL, Ltd. The crystal orientation information is obtained under conditions including an accelerating voltage of 7 kV and a measurement point spacing of 80 nm to measure portions determined to be FCC in the region. From the data obtained by such measurement, the amount of Mn in the retained austenite is determined by the calibration-curve method.

(Measurement of Amount of C in Retained Austenite)

A carbon concentration "Cγ" in retained austenite can be determined by the X-ray diffraction. First, a portion of the steel sheet from its surface to a ¼ sheet-thickness point is removed by mechanical polishing and chemical polishing. Next, a surface subjected to the chemical polishing is subjected to measurement using MoKα X-ray as a characteristic X-ray. Based on positions of diffraction peaks of (200), (220), (311) of an fcc phase, a lattice constant "dγ" of retained austenite is determined In addition, chemical component values of each sample obtained by chemical analysis are used, by which the carbon concentration Cγ of retained austenite can be calculated by the following formula. In the following formula, each symbol of an element indicates a content of the element (mass %) contained in a sample.

$$C\gamma = (100 \times d\gamma - 357.3 - 0.095 \times Mn + 0.02 \times Ni - 0.06 \times Cr - 0.31 \times Mo - 0.18 \times V - 2.2 \times N - 0.56 \times Al + 0.04 \times Co - 0.15 \times Cu - 0.51 \times Nb - 0.39 \times Ti - 0.18 \times W)/3.3$$

Note that the carbon concentration Cγ of retained austenite does not include an amount of carbon present in a form of carbides.

(Measurement of the Number of Carbides)

The number of carbides is measured based on an image of a steel micro-structure captured under a scanning electron microscope. Prior to the observation, an observation surface of a sample for steel micro-structure observation is subjected to wet polishing using emery paper and polished with diamond abrasive having an average particle size of 1 μm to a mirror finish, and then its steel micro-structure is etched with saturated picric acid alcoholic solution. A visual field centered about a t/4-sheet-thickness point is observed with a magnification of the observation set at ×5000, where a plurality of randomly selected spots are captured such that a total area of the spots becomes 20000 μm². The captured image is analyzed with image analysis software typified by WinROOF made by MITANI CORPORATION, and areas of carbides included in a region of 20000 μm² are measured in detail. With an assumption that each carbide has a circular shape, a radius of each carbide (equivalent circle radius) is determined from the areas determined by the image analysis, and the number of carbides having a radius of 0.1 μm or more is calculated.

(Measurement of Tensile Strength TS and Elongation El)

Measurement was performed in conformance with JIS Z 2241(2011) and using No. 5 test coupons that were taken from the steel sheet in a direction perpendicular to a rolling direction of the steel sheet, and tensile strengths TS (MPa) and elongations El (%) were determined.

(Bending Test)

Bendability was evaluated in accordance with the VDA standard (VDA238-100) defined by German Association of the Automotive Industry under the following measurement conditions. In the present invention, a maximum bending angle α was determined by converting a displacement at a maximum load obtained by the bending test into an angle in accordance with the VDA standard. A test specimen resulting in a maximum bending angle α (deg) of $2.37t^2 - 14t + 65$ or more was rated as good. Here, t denotes a sheet thickness (mm).

Test specimen dimensions: 60 mm (rolling direction)×60 mm (direction perpendicular to rolling direction)

Bending ridgeline: A punch was pressed such that a bending ridge line extends in a direction perpendicular to the rolling direction.

Test method: Roll supported, punch press

Distance between rolls: φ30 mm

Punch shape: Tip R=0.4 mm

Support spacing: 2.0×Sheet thickness (mm)+0.5 mm

Pressing speed: 20 mm/min

Test machine: SIMADZU AUTOGRAPH 20 kN (Measurement of Limiting Hole Expansion Ratio)

In measurement of a limiting hole expansion ratio (λ), first, a piece of sheet measuring 90 mm±10 mm each side was cut out, and a hole having a diameter of 10 mm was punched at a center of the piece of sheet, by which a test specimen for hole expansion is prepared. A clearance of the punching was set at 12.5%. The test specimen was placed at a position at which a distance between a tip of a cone-shaped jig for the hole expansion and a center portion of the punched hole is within ±1 mm, and a hole expansion value was measured in conformity with JIS Z 2256 (2010).

(Evaluation of Crash Resistance)

For evaluation of crash resistance, a test specimen resulting in a maximum bending angle α (deg) of $2.37t^2 - 14t + 65$ or more, TS×El of 15000 or more, and TS×λ of 33000 or more was rated as "○", and a test specimen failed to satisfy any one of them was rated as "×".

TABLE 1

| | Chemical composition(mass % the balance: Fe and impurities) | | | | | | | | | | | | | | |
|---|---|---|---|---|---|---|---|---|---|---|---|---|---|---|---|
| No. | C | Si | Mn | P | S | N | O | Al | B | Ti | Nb | V | Mo | Cr | Co |
| 1 | 0.20 | 1.14 | 3.1 | 0.0176 | 0.0016 | 0.0009 | 0.0020 | — | 0.0012 | 0.02 | 0.02 | — | — | — | — |
| 2 | 0.20 | 1.01 | 0.8 | 0.0017 | 0.0010 | 0.0070 | 0.0193 | 0.101 | 0.0020 | — | — | — | 0.15 | — | — |
| 3 | 0.31 | 2.34 | 0.8 | 0.0157 | 0.0062 | 0.0003 | 0.0001 | 0.353 | — | — | — | — | — | 0.5 | — |
| 4 | 0.33 | 0.95 | 1.1 | 0.0023 | 0.0030 | 0.0162 | 0.0080 | 0.095 | — | — | — | — | — | — | — |
| 5 | 0.20 | 2.26 | 0.8 | 0.0023 | 0.0022 | 0.0006 | 0.0003 | 0.113 | 0.0020 | — | — | — | 0.05 | — | — |
| 6 | 0.21 | 1.25 | 1.4 | 0.0029 | 0.0164 | 0.0002 | 0.0014 | 0.184 | — | 0.03 | — | 0.10 | — | — | — |
| 7 | 0.32 | 1.74 | 2.3 | 0.0011 | 0.0011 | 0.0020 | 0.0012 | 0.030 | — | — | 0.02 | — | — | — | — |
| 8 | 0.28 | 2.15 | 1.1 | 0.0014 | 0.0112 | 0.0025 | 0.0009 | 0.169 | — | — | — | — | — | — | — |
| 9 | 0.19 | 0.99 | 0.8 | 0.0020 | 0.0021 | 0.0138 | 0.0033 | 0.258 | — | — | — | — | — | — | — |
| 10 | 0.33 | 0.97 | 3.2 | 0.0172 | 0.0150 | 0.0034 | 0.0061 | 0.760 | — | — | — | — | — | — | — |
| 11 | 0.19 | 0.94 | 0.8 | 0.0111 | 0.0172 | 0.0035 | 0.0027 | 0.082 | — | — | — | — | 0.10 | — | — |
| 12 | 0.20 | 0.98 | 0.9 | 0.0014 | 0.0017 | 0.0036 | 0.0142 | 0.032 | 0.0020 | — | — | — | 0.3 | — | — |
| 13 | 0.20 | 0.95 | 0.8 | 0.0033 | 0.0013 | 0.0161 | 0.0146 | 0.055 | 0.0011 | — | — | — | — | — | — |
| 14 | 0.21 | 0.90 | 2.9 | 0.0179 | 0.0174 | 0.0060 | 0.0007 | 0.796 | — | — | 0.04 | — | — | — | — |
| 15 | 0.23 | 2.22 | 4.6 | 0.0061 | 0.0037 | 0.0039 | 0.0031 | 0.096 | — | 0.03 | — | — | — | — | — |
| 16 | 0.32 | 1.74 | 2.2 | 0.0142 | 0.0013 | 0.0035 | 0.0001 | — | — | — | — | — | — | — | — |
| 17 | 0.25 | 2.29 | 0.9 | 0.0169 | 0.0027 | 0.0041 | 0.0019 | 0.653 | 0.0022 | — | — | — | 0.08 | — | — |

TABLE 1-continued

| | | | | | | | | | | | | | | | |
|---|---|---|---|---|---|---|---|---|---|---|---|---|---|---|---|
| 18 | 0.25 | 1.20 | 2.3 | 0.0154 | 0.0106 | 0.0023 | 0.0016 | 0.139 | 0.0018 | 0.03 | — | — | — | — | 0.15 |
| 19 | 0.24 | 1.19 | 2.8 | 0.0036 | 0.0160 | 0.0173 | 0.0019 | — | — | — | — | 0.13 | — | — | — |
| 20 | 0.22 | 1.52 | 3.0 | 0.0020 | 0.0020 | 0.0021 | 0.0180 | 0.050 | — | — | — | — | — | — | — |

| | Chemical composition(mass % the balance: Fe and impurities) | | | | | | | | | | | | |
|---|---|---|---|---|---|---|---|---|---|---|---|---|---|
| No. | Ni | Cu | W | Ta | Sn | Sb | As | Mg | Ca | Y | Zr | La | Ce | Ac$_3$ |
| 1 | — | — | — | — | — | — | — | — | — | — | — | — | — | 862 |
| 2 | — | — | — | — | — | — | — | — | — | — | — | — | — | 861 |
| 3 | — | — | — | — | — | — | — | — | — | — | — | — | — | 892 |
| 4 | 0.10 | — | — | — | — | — | — | — | — | — | — | — | — | 825 |
| 5 | — | — | — | — | — | — | — | — | — | — | — | — | — | 914 |
| 6 | — | 0.32 | — | — | — | — | — | — | — | — | — | — | — | 875 |
| 7 | — | — | — | — | — | — | — | — | — | — | — | — | 0.006 | 864 |
| 8 | 0.05 | — | — | — | — | — | — | — | 0.030 | — | — | — | — | 889 |
| 9 | — | — | — | — | — | — | — | — | — | — | — | 0.002 | — | 857 |
| 10 | — | — | — | — | — | — | 0.008 | — | — | — | — | — | — | 828 |
| 11 | — | 0.20 | — | — | — | — | — | — | — | — | — | — | — | 857 |
| 12 | — | — | 0.022 | — | — | — | — | — | — | — | — | — | — | 855 |
| 13 | 0.15 | — | — | — | — | — | — | — | 0.040 | — | — | — | — | 850 |
| 14 | — | — | — | — | 0.030 | — | — | — | — | — | — | — | — | 849 |
| 15 | — | — | — | — | — | — | — | — | — | 0.020 | — | — | — | 903 |
| 16 | — | 0.10 | — | — | — | — | — | — | — | — | — | — | — | 864 |
| 17 | — | — | — | — | — | 0.007 | — | — | — | — | — | — | — | 905 |
| 18 | — | 0.20 | — | — | — | — | — | — | — | — | — | — | — | 853 |
| 19 | — | — | — | — | — | — | — | — | — | — | — | — | — | 869 |
| 20 | — | — | — | — | — | — | — | — | — | — | 0.050 | — | — | 874 |

TABLE 2

| | Chemical composition(mass % the balance: Fe and impurities) | | | | | | | | | | | | | |
|---|---|---|---|---|---|---|---|---|---|---|---|---|---|---|
| No. | C | Si | Mn | P | S | N | O | Al | B | Ti | Nb | V | Mo | Cr | Co |
| 21 | 0.28 | 2.13 | 1.7 | 0.0022 | 0.0169 | 0.0026 | 0.0019 | 0.211 | — | — | — | — | — | — | — |
| 22 | 0.20 | 2.30 | 2.6 | 0.0104 | 0.0032 | 0.0032 | 0.0042 | 0.065 | — | — | — | — | — | — | — |
| 23 | 0.19 | 2.36 | 1.0 | 0.0026 | 0.0027 | 0.0030 | 0.0022 | — | — | — | — | — | — | 1.0 | — |
| 24 | 0.19 | 1.54 | 2.4 | 0.0048 | 0.0003 | 0.0028 | 0.0033 | 0.082 | — | — | — | — | — | 0.6 | — |
| 25 | 0.29 | 0.93 | 1.3 | 0.0013 | 0.0049 | 0.0013 | 0.0032 | 0.077 | 0.0015 | — | — | — | — | — | — |
| 26 | 0.33 | 1.19 | 1.0 | 0.0011 | 0.0008 | 0.0152 | 0.0003 | 0.060 | — | — | — | — | 0.50 | — | — |
| 27 | 0.29 | 1.00 | 1.8 | 0.0039 | 0.0012 | 0.0104 | 0.0151 | 0.170 | — | 0.08 | — | — | — | — | — |
| 28 | 0.30 | 1.41 | 3.0 | 0.0011 | 0.0032 | 0.0004 | 0.0016 | 0.898 | — | — | — | — | — | — | — |
| 29 | 0.32 | 0.95 | 1.8 | 0.0001 | 0.0159 | 0.0011 | 0.0021 | 0.800 | — | — | — | — | — | — | — |
| 30 | 0.26 | 2.04 | 2.9 | 0.0010 | 0.0003 | 0.0017 | 0.0134 | 0.559 | — | — | — | — | — | — | — |
| 31 | 0.21 | 1.96 | 1.0 | 0.0009 | 0.0028 | 0.0021 | 0.0015 | — | — | — | 0.03 | 0.10 | — | — | — |
| 32 | 0.19 | 0.84 | 1.7 | 0.0018 | 0.0014 | 0.0024 | 0.0030 | 0.304 | — | — | — | — | — | — | — |
| 33 | 0.20 | 1.56 | 3.1 | 0.0017 | 0.0016 | 0.0029 | 0.0007 | 0.156 | — | — | — | — | — | — | — |
| 34 | 0.19 | 1.67 | 1.4 | 0.0036 | 0.0012 | 0.0008 | 0.0023 | 0.188 | 0.0030 | — | — | — | — | — | — |
| 35 | 0.20 | 2.24 | 2.5 | 0.0023 | 0.0015 | 0.0004 | 0.0065 | 0.173 | — | — | — | — | — | — | — |
| 36 | 0.21 | 0.99 | 2.6 | 0.0020 | 0.0006 | 0.0018 | 0.0017 | 0.900 | — | — | — | — | 0.05 | — | — |
| 37 | 0.20 | 1.98 | 0.9 | 0.0029 | 0.0012 | 0.0036 | 0.0034 | 0.038 | — | — | — | — | — | 0.5 | — |
| 38 | 0.20 | 1.20 | 3.3 | 0.0035 | 0.0029 | 0.0182 | 0.0004 | 0.803 | — | — | — | — | — | — | — |
| 39 | 0.20 | 2.32 | 3.0 | 0.0021 | 0.0013 | 0.0021 | 0.0178 | 0.144 | — | — | — | — | — | — | — |
| 40 | 0.19 | 1.24 | 1.3 | 0.0031 | 0.0036 | 0.0056 | 0.0148 | 0.047 | 0.0023 | — | — | — | — | — | — |

| | Chemical composition(mass % the balance: Fe and impurities) | | | | | | | | | | | | |
|---|---|---|---|---|---|---|---|---|---|---|---|---|---|
| No. | Ni | Cu | W | Ta | Sn | Sb | As | Mg | Ca | Y | Zr | La | Ce | Ac$_3$ |
| 21 | — | — | — | 0.050 | — | — | — | — | — | — | 0.020 | — | — | 889 |
| 22 | — | 0.30 | — | — | — | — | — | — | — | — | — | — | — | 914 |
| 23 | — | — | — | — | — | — | — | — | — | — | — | — | — | 917 |
| 24 | — | — | — | — | — | — | — | — | — | — | — | — | — | 880 |
| 25 | — | — | — | — | — | — | — | — | — | — | — | — | — | 836 |
| 26 | — | 0.15 | — | — | — | — | — | — | — | — | — | — | — | 854 |
| 27 | — | — | — | — | — | — | — | — | — | — | — | — | — | 836 |
| 28 | — | — | — | — | — | — | — | — | — | — | — | — | — | 853 |
| 29 | — | — | — | — | — | — | — | — | — | — | — | — | — | 830 |
| 30 | — | — | — | — | — | — | — | — | — | — | — | — | — | 889 |
| 31 | — | — | — | — | — | — | — | — | — | — | — | — | — | 906 |
| 32 | 0.20 | — | — | — | — | — | — | — | — | — | — | — | — | 848 |
| 33 | — | — | — | — | 0.020 | — | — | — | — | — | — | — | — | 881 |
| 34 | — | — | — | — | — | — | — | — | — | — | — | — | — | 887 |
| 35 | — | — | — | — | — | — | — | — | — | — | — | — | — | 910 |
| 36 | — | — | — | — | — | — | — | — | — | — | — | — | — | 855 |

TABLE 2-continued

| | | | | | | | | | | | | | |
|---|---|---|---|---|---|---|---|---|---|---|---|---|---|
| 37 | — | — | — | — | — | — | — | — | — | — | — | — | 900 |
| 38 | 0.05 | 0.10 | — | — | — | — | — | — | — | — | — | — | 863 |
| 39 | — | — | — | — | — | — | — | — | — | — | — | — | 913 |
| 40 | — | — | — | — | — | — | — | — | — | — | — | — | 868 |

TABLE 3

| | Chemical composition(mass % the balance: Fe and impurities) | | | | | | | | | | | | | | |
|---|---|---|---|---|---|---|---|---|---|---|---|---|---|---|---|
| No. | C | Si | Mn | P | S | N | O | Al | B | Ti | Nb | V | Mo | Cr | Co |
| 41 | 0.21 | 1.62 | 1.6 | 0.0029 | 0.0019 | 0.0020 | 0.0008 | 0.489 | 0.0020 | — | — | — | — | — | — |
| 42 | 0.19 | 2.15 | 3.0 | 0.0021 | 0.0035 | 0.0186 | 0.0042 | 0.179 | — | — | — | — | — | — | — |
| 43 | 0.19 | 1.87 | 2.0 | 0.0032 | 0.0021 | 0.0021 | 0.0054 | 0.138 | — | 0.10 | — | — | — | — | — |
| 44 | 0.19 | 1.35 | 0.9 | 0.0006 | 0.0022 | 0.0035 | 0.0021 | 0.194 | — | — | — | — | — | 1.3 | — |
| 45 | 0.19 | 1.61 | 2.2 | 0.0006 | 0.0014 | 0.0035 | 0.0011 | 0.036 | — | — | 0.05 | — | — | — | — |
| 46 | 0.20 | 1.94 | 2.3 | 0.0037 | 0.0008 | 0.0121 | 0.0033 | — | — | — | — | — | — | — | — |
| 47 | 0.21 | 1.73 | 2.2 | 0.0014 | 0.0009 | 0.0022 | 0.0018 | 0.071 | — | — | — | — | — | — | 0.10 |
| 48 | 0.21 | 0.89 | 1.5 | 0.0036 | 0.0005 | 0.0031 | 0.0011 | 0.091 | — | 0.04 | — | — | — | — | — |
| 49 | 0.20 | 1.24 | 1.9 | 0.0026 | 0.0024 | 0.0022 | 0.0064 | 0.156 | — | — | — | — | — | — | — |
| 50 | 0.19 | 1.81 | 2.8 | 0.0010 | 0.0009 | 0.0007 | 0.0018 | 0.143 | — | — | — | — | — | — | — |
| 51 | 0.19 | 1.36 | 3.2 | 0.0034 | 0.0015 | 0.0013 | 0.0050 | 0.165 | — | — | — | — | — | — | — |
| <u>52</u> | <u>0.10</u> | 0.87 | 3.1 | 0.0168 | 0.0155 | 0.0031 | 0.0079 | 0.009 | — | — | — | — | — | — | — |
| <u>53</u> | <u>0.39</u> | 1.16 | 1.0 | 0.0027 | 0.0038 | 0.0023 | 0.0188 | 0.008 | — | — | — | — | — | — | — |
| <u>54</u> | 0.19 | <u>0.40</u> | 1.5 | 0.0022 | 0.0015 | 0.0125 | 0.0090 | 0.440 | — | — | — | — | — | — | — |
| <u>55</u> | 0.28 | <u>2.55</u> | 1.0 | 0.0018 | 0.0159 | 0.0031 | 0.0013 | 0.918 | — | — | — | — | — | — | — |
| <u>56</u> | 0.32 | <u>2.28</u> | <u>0.1</u> | 0.0018 | 0.0019 | 0.0148 | 0.0028 | 0.040 | — | — | — | — | — | — | — |
| <u>57</u> | 0.29 | 2.23 | <u>5.5</u> | 0.0024 | 0.0017 | 0.0022 | 0.0156 | 0.442 | — | — | — | — | — | — | — |
| <u>58</u> | 0.22 | 1.59 | <u>2.2</u> | <u>0.0206</u> | 0.0019 | 0.0140 | 0.0006 | 0.769 | — | — | — | — | — | — | — |
| <u>59</u> | 0.20 | 0.97 | 0.8 | <u>0.0019</u> | 0.0208 | 0.0021 | 0.0015 | — | — | — | — | — | — | — | — |
| <u>60</u> | 0.31 | 1.43 | 1.0 | 0.0029 | <u>0.0075</u> | <u>0.0207</u> | 0.0024 | 0.005 | — | — | — | — | — | — | — |

| | Chemical composition(mass % the balance: Fe and impurities) | | | | | | | | | | | | |
|---|---|---|---|---|---|---|---|---|---|---|---|---|---|
| No. | Ni | Cu | W | Ta | Sn | Sb | As | Mg | Ca | Y | Zr | La | Ce | Ac3 |
| 41 | — | — | — | — | — | 0.020 | — | — | — | — | — | — | — | 882 |
| 42 | — | — | — | — | — | — | — | — | — | — | — | — | — | 908 |
| 43 | — | — | — | — | — | — | — | — | — | — | — | — | — | 896 |
| 44 | — | — | — | — | — | — | — | — | — | — | — | — | — | 873 |
| 45 | — | — | — | — | — | — | — | — | — | — | — | — | — | 885 |
| 46 | — | — | 0.050 | — | — | — | — | — | — | — | — | — | — | 900 |
| 47 | — | — | — | — | — | — | — | — | — | — | — | — | — | 886 |
| 48 | — | — | — | — | — | — | — | — | — | — | — | — | — | 848 |
| 49 | — | — | — | — | — | — | — | — | — | — | — | — | — | 866 |
| 50 | — | — | — | — | — | — | — | — | — | — | — | — | — | 894 |
| 51 | — | — | — | — | — | — | — | — | — | — | — | — | — | 872 |
| <u>52</u> | — | — | — | — | — | — | — | — | — | — | — | — | — | 876 |
| <u>53</u> | — | — | — | — | — | — | — | — | — | — | — | — | — | 826 |
| <u>54</u> | — | — | — | — | — | — | — | — | — | — | — | — | — | 830 |
| <u>55</u> | — | — | — | — | — | — | — | — | — | — | — | — | — | 907 |
| <u>56</u> | — | — | — | — | — | — | — | — | — | — | — | — | — | 889 |
| <u>57</u> | — | — | — | — | — | — | — | — | — | — | — | — | — | 891 |
| <u>58</u> | — | — | — | — | — | — | — | — | — | — | — | — | — | 878 |
| <u>59</u> | — | — | — | — | — | — | — | — | — | — | — | — | — | 854 |
| <u>60</u> | — | — | — | — | — | — | — | — | — | — | — | — | — | 852 |

Underline shows that it does not meet the claimed range.

TABLE 4

| | Chemical composition(mass % the balance: Fe and impurities) | | | | | | | | | | | | | | |
|---|---|---|---|---|---|---|---|---|---|---|---|---|---|---|---|
| No. | C | Si | Mn | P | S | N | O | Al | B | Ti | Nb | V | Mo | Cr | Co |
| <u>61</u> | 0.25 | 2.26 | 1.1 | 0.0166 | 0.0014 | 0.0018 | 0.0087 | <u>1.034</u> | — | — | — | — | — | — | — |
| <u>62</u> | 0.33 | 0.93 | 0.8 | 0.0050 | 0.0038 | 0.0035 | 0.0148 | <u>0.444</u> | <u>0.0104</u> | — | — | — | — | — | — |
| <u>63</u> | 0.19 | 2.06 | 3.1 | 0.0011 | 0.0174 | 0.0119 | 0.0113 | 0.199 | — | <u>0.10</u> | — | — | — | — | — |
| <u>64</u> | 0.20 | 0.99 | 0.9 | 0.0013 | 0.0165 | 0.0187 | 0.0024 | 0.010 | — | — | <u>0.10</u> | — | — | — | — |
| <u>65</u> | 0.21 | 2.27 | 3.2 | 0.0148 | 0.0111 | 0.0138 | 0.0021 | 0.112 | — | — | — | <u>0.51</u> | — | — | — |
| <u>66</u> | 0.33 | 0.91 | 0.9 | 0.0019 | 0.0025 | 0.0107 | <u>0.0206</u> | 0.205 | — | — | — | — | — | — | — |
| <u>67</u> | 0.20 | 1.05 | 0.8 | 0.0025 | 0.0169 | 0.0156 | 0.0024 | 0.195 | — | — | — | — | <u>0.52</u> | — | — |

TABLE 4-continued

| No. | | | | | | | | | | | | | | | |
|---|---|---|---|---|---|---|---|---|---|---|---|---|---|---|---|
| 68 | 0.20 | 0.94 | 0.9 | 0.0165 | 0.0061 | 0.0049 | 0.0018 | 0.234 | — | — | — | — | — | 2.1 | — |
| 69 | 0.19 | 1.05 | 0.9 | 0.0178 | 0.0021 | 0.0016 | 0.0033 | 0.576 | — | — | — | — | — | — | 0.51 |
| 70 | 0.19 | 0.98 | 2.9 | 0.0128 | 0.0020 | 0.0035 | 0.0014 | 0.150 | — | — | — | — | — | — | — |
| 71 | 0.19 | 1.35 | 0.9 | 0.0165 | 0.0018 | 0.0067 | 0.0005 | 0.164 | — | — | — | — | — | — | — |
| 72 | 0.20 | 0.94 | 0.7 | 0.0068 | 0.0024 | 0.0023 | 0.0029 | — | — | — | — | — | — | — | — |
| 73 | 0.21 | 1.75 | 1.1 | 0.0148 | 0.0013 | 0.0015 | 0.0010 | 0.028 | — | — | — | — | — | — | — |
| 74 | 0.19 | 2.24 | 3.1 | 0.0016 | 0.0014 | 0.0113 | 0.0031 | 0.229 | — | — | — | — | — | — | — |
| 75 | 0.19 | 0.97 | 3.1 | 0.0183 | 0.0018 | 0.0011 | 0.0034 | 0.172 | — | — | — | — | — | — | — |
| 76 | 0.22 | 2.27 | 0.9 | 0.0037 | 0.0022 | 0.0035 | 0.0009 | 0.736 | — | — | — | — | — | — | — |
| 77 | 0.20 | 2.19 | 2.3 | 0.0019 | 0.0181 | 0.0141 | 0.0028 | — | — | — | — | — | — | — | — |
| 78 | 0.20 | 1.10 | 0.9 | 0.0011 | 0.0023 | 0.0027 | 0.0024 | 0.856 | — | — | — | — | — | — | — |
| 79 | 0.20 | 1.06 | 1.2 | 0.0015 | 0.0020 | 0.0014 | 0.0030 | 0.135 | — | — | — | — | — | — | — |
| 80 | 0.31 | 0.92 | 1.7 | 0.0167 | 0.0059 | 0.0173 | 0.0021 | 0.118 | — | — | — | — | — | — | — |
| 81 | 0.23 | 0.99 | 1.1 | 0.0105 | 0.0177 | 0.0049 | 0.0027 | 0.673 | — | — | — | — | — | — | — |
| 82 | 0.33 | 1.25 | 1.0 | 0.0017 | 0.0037 | 0.0131 | 0.0013 | 0.020 | — | — | — | — | — | — | — |

| | Chemical composition(mass % the balance: Fe and impurities) | | | | | | | | | | | | | |
|---|---|---|---|---|---|---|---|---|---|---|---|---|---|---|
| No. | Ni | Cu | W | Ta | Sn | Sb | As | Mg | Ca | Y | Zr | La | Ce | Ac3 |
| 61 | — | — | — | — | — | — | — | — | — | — | — | — | — | 901 |
| 62 | — | — | — | — | — | — | — | — | — | — | — | — | — | 826 |
| 63 | — | — | — | — | — | — | — | — | — | — | — | — | — | 905 |
| 64 | — | — | — | — | — | — | — | — | — | — | — | — | — | 855 |
| 65 | — | — | — | — | — | — | — | — | — | — | — | — | — | 962 |
| 66 | — | — | — | — | — | — | — | — | — | — | — | — | — | 825 |
| 67 | — | — | — | — | — | — | — | — | — | — | — | — | — | 875 |
| 68 | — | — | — | — | — | — | — | — | — | — | — | — | — | 851 |
| 69 | — | — | — | — | — | — | — | — | — | — | — | — | — | 859 |
| 70 | 1.03 | — | — | — | — | — | — | — | — | — | — | — | — | 841 |
| 71 | — | 0.52 | — | — | — | — | — | — | — | — | — | — | — | 872 |
| 72 | — | — | 0.104 | — | — | — | — | — | — | — | — | — | — | 854 |
| 73 | — | — | — | 0.103 | — | — | — | — | — | — | — | — | — | 886 |
| 74 | — | — | — | — | 0.052 | — | — | — | — | — | — | — | — | 812 |
| 75 | — | — | — | — | — | 0.051 | — | — | — | — | — | — | — | 856 |
| 76 | — | — | — | — | — | — | 0.051 | — | — | — | — | — | — | 907 |
| 77 | — | — | — | — | — | — | — | 0.052 | — | — | — | — | — | 909 |
| 78 | — | — | — | — | — | — | — | — | 0.051 | — | — | — | — | 859 |
| 79 | — | — | — | — | — | — | — | — | — | 0.051 | — | — | — | 859 |
| 80 | — | — | — | — | — | — | — | — | — | — | 0.052 | — | — | 827 |
| 81 | — | — | — | — | — | — | — | — | — | — | — | 0.052 | — | 849 |
| 82 | — | — | — | — | — | — | — | — | — | — | — | — | 0.052 | 841 |

Underline shows that it does not meet the claimed range.

TABLE 5

| No | Hot Rolling Heat Temp. (°C.) | Hot Rolling Finish Temp. (°C.) | Hot Rolling Cooling Temp. (°C.) | Cold Rolling Rolling Reduction (%) | First Heat Treatment Heat Temp. (°C.) | First Heat Treatment Held Time (sec) | First Heat Treatment First-stage Cooling Cooling Rate (°C./s) | First Heat Treatment First-stage Cooling Stop Temp. (°C.) | First Heat Treatment Cooling Rate (°C./s) | First Heat Treatment Stop Temp. (°C.) | Second Heat Treatment Heat Temp. (°C.) | Second Heat Treatment Held Time (sec) | Second Heat Treatment First-stage Cooling Cooling Rate (°C./s) | Second Heat Treatment First-stage Cooling Stop Temp. (°C.) | Second Heat Treatment Cooling Rate (°C./s) | Second Heat Treatment Stop Temp. (°C.) | Second Heat Treatment Holding Temp. (°C.) | Second Heat Treatment Holding Time (sec) | Tempering Heat Temp. (°C.) | Tempering Held Time (sec) | Plating Existence |
|---|---|---|---|---|---|---|---|---|---|---|---|---|---|---|---|---|---|---|---|---|---|
| A | 1,250 | 900 | 577 | 31 | 931 | 360 | — | — | 88 | 134 | 870 | 263 | — | — | 64 | 180 | 280 | 185 | — | — | None |
| B | 1,253 | 862 | 645 | 47 | 986 | 111 | — | — | 28 | 273 | 944 | 524 | — | — | 99 | 250 | 289 | 207 | — | — | None |
| C | 1,160 | 989 | 632 | 63 | 900 | 388 | — | — | 181 | 212 | 900 | 407 | — | — | 102 | 190 | 411 | 138 | — | — | None |
| D | 1,107 | 958 | 674 | 55 | 987 | 75 | — | — | 178 | 64 | 893 | 350 | — | — | 84 | 180 | 313 | 129 | — | — | Existence |
| E | 1,175 | 892 | 693 | 34 | 936 | 169 | — | — | 58 | 262 | 960 | 305 | — | — | 137 | 250 | 250 | 299 | — | — | None |
| F | 1,250 | 901 | 581 | 44 | 886 | 343 | — | — | 170 | 175 | 915 | 85 | — | — | 90 | 220 | 320 | 221 | — | — | None |
| G | 1,198 | 949 | 583 | 74 | 865 | 248 | — | — | 102 | 151 | 880 | 252 | — | — | 142 | 140 | 376 | 125 | — | — | None |
| H | 1,132 | 855 | 630 | 74 | 900 | 299 | — | — | 42 | 231 | 932 | 74 | — | — | 197 | 200 | 292 | 225 | — | — | Existence |
| I | 1,175 | 851 | 697 | 70 | 916 | 255 | — | — | 40 | 97 | 879 | 182 | — | — | 59 | 260 | 270 | 118 | — | — | None |
| J | 1,221 | 876 | 593 | 47 | 895 | 472 | — | — | 43 | 49 | 955 | 282 | — | — | 148 | 110 | 353 | 167 | — | — | None |
| K | 1,298 | 916 | 632 | 58 | 886 | 117 | 5 | 680 | 178 | 238 | 860 | 37 | — | — | 189 | 255 | 330 | 289 | — | — | None |
| L | 1,300 | 950 | 673 | 31 | 947 | 129 | — | — | 114 | 189 | 969 | 225 | — | — | 164 | 245 | 310 | 194 | 300 | 100 | None |
| M | 1,235 | 918 | 572 | 55 | 976 | 495 | — | — | 84 | 67 | 900 | 117 | — | — | 67 | 250 | 310 | 143 | — | — | None |
| N | 1,132 | 964 | 600 | 66 | 945 | 31 | — | — | 166 | 93 | 962 | 314 | — | — | 170 | 180 | 300 | 105 | — | — | None |
| O | 1,257 | 922 | 617 | 68 | 910 | 371 | — | — | 180 | 298 | 920 | 406 | — | — | 183 | 165 | 340 | 132 | — | — | None |
| P | 1,107 | 861 | 569 | 33 | 880 | 35 | — | — | 56 | 43 | 890 | 60 | — | — | 195 | 150 | 350 | 270 | — | — | None |
| Q | 1,122 | 866 | 557 | 34 | 920 | 100 | — | — | 40 | 41 | 910 | 56 | 3 | 650 | 91 | 220 | 320 | 107 | — | — | Existence (Galvannealed) |
| R | 1,112 | 860 | 564 | 35 | 860 | 17 | — | — | 197 | 40 | 860 | 51 | — | — | 125 | 180 | 262 | 122 | — | — | None |
| S | 1,103 | 866 | 562 | 31 | 890 | 12 | — | — | 67 | 25 | 875 | 32 | — | — | 66 | 165 | 342 | 176 | — | — | None |
| T | 1,115 | 870 | 551 | 30 | 880 | 29 | — | — | 174 | 40 | 880 | 36 | — | — | 91 | 170 | 350 | 275 | — | — | None |

TABLE 6

| | Hot Rolling | | | Cold Rolling | First Heat Treatment | | | First-stage Cooling | | | | | Second Heat Treatment | | | First-stage Cooling | | | | | Tempering | | |
|---|---|---|---|---|---|---|---|---|---|---|---|---|---|---|---|---|---|---|---|---|---|---|---|
| No | Heat Temp. (° C.) | Finish Temp. (° C.) | Cooling Temp. (° C.) | Rolling Reduction (%) | Heat Temp. (° C.) | Held Time (sec) | Cooling Rate (° C./s) | Stop Temp. (° C.) | Cooling Rate (° C./s) | Stop Temp. (° C.) | Heat Temp. (° C.) | Held Time (sec) | Cooling Rate (° C./s) | Stop Temp. (° C.) | Cooling Rate (° C./s) | Stop Temp. (° C.) | Holding Temp. (° C.) | Holding Time (sec) | Heat Temp. (° C.) | Held Time (sec) | Plating Existence |
| U | 1,121 | 870 | 551 | 45 | 900 | 75 | — | — | 80 | 31 | 900 | 31 | — | — | 159 | 185 | 349 | 258 | — | — | Existence |
| V | 1,111 | 885 | 552 | 31 | 920 | 37 | — | — | 43 | 41 | 930 | 76 | — | — | 43 | 195 | 332 | 100 | 250 | 300 | None |
| W | 1,114 | 856 | 557 | 33 | 932 | 10 | — | — | 148 | 53 | 940 | 36 | — | — | 182 | 230 | 333 | 223 | — | — | None |
| X | 1,101 | 865 | 554 | 36 | 880 | 42 | — | — | 169 | 100 | 890 | 74 | — | — | 182 | 190 | 293 | 148 | — | — | None |
| Y | 1,153 | 864 | 564 | 32 | 860 | 68 | — | — | 156 | 50 | 840 | 55 | — | — | 104 | 200 | 308 | 82 | — | — | None |
| Z | 1,160 | 853 | 557 | 35 | 877 | 135 | — | — | 160 | 32 | 870 | 150 | — | — | 165 | 175 | 408 | 32 | — | — | None |
| AA | 1,122 | 858 | 580 | 33 | 841 | 55 | — | — | 131 | 200 | 853 | 33 | — | — | 117 | 175 | 285 | 32 | — | — | None |
| AB | 1,111 | 857 | 551 | 31 | 915 | 198 | 3 | 690 | 112 | 36 | 890 | 73 | 2 | 650 | 77 | 135 | 263 | 80 | — | — | None |
| AC | 1,125 | 869 | 554 | 50 | 864 | 46 | — | — | 163 | 25 | 838 | 75 | — | — | 123 | 165 | 401 | 84 | — | — | None |
| AD | 1,121 | 860 | 567 | 55 | 900 | 46 | — | — | 81 | 33 | 900 | 72 | — | — | 141 | 155 | 268 | 37 | — | — | None |
| AE | 1,121 | 860 | 567 | 64 | 900 | 46 | — | — | 81 | 33 | 900 | 72 | — | — | 141 | 155 | 268 | 37 | — | — | Existence |
| AF | 1,121 | 860 | 567 | 38 | 900 | 46 | — | — | 81 | 33 | 900 | 72 | — | — | 141 | 155 | 268 | 37 | — | — | Existence (Galvannealed) |
| AG | 1,226 | 855 | <u>400</u> | 45 | 970 | 460 | — | — | 57 | 47 | 910 | 202 | — | — | 129 | 220 | 300 | 104 | — | — | None |
| AH | 1,149 | 937 | <u>670</u> | <u>12</u> | | | | | | | | | | | | | | | | | |
| AI | 1,169 | 921 | 660 | <u>81</u> | | | | | | | | | | | | | | | | | |
| AJ | 1,185 | 941 | | <u>70</u> | | | | | | | | | | | | | | | | | |
| AK | 1,261 | 883 | 633 | 50 | 750 | 430 | — | — | 157 | 44 | 934 | 475 | — | — | 59 | 180 | 300 | 297 | — | — | None |
| AL | 1,128 | 919 | 565 | 56 | 890 | 0 | — | — | 200 | 48 | 947 | 109 | — | — | 178 | 190 | 300 | 282 | — | — | None |
| AM | 1,206 | 885 | <u>352</u> | 35 | 912 | <u>620</u> | — | — | 28 | 110 | 920 | 629 | — | — | 182 | 205 | 300 | 258 | — | — | None |
| AN | 1,250 | 980 | <u>572</u> | 63 | 902 | 285 | <u>0.1</u> | <u>627</u> | 136 | 88 | 958 | <u>282</u> | — | — | 114 | 170 | 262 | 101 | — | — | None |
| AO | 1,277 | 860 | 588 | | 910 | 66 | <u>5</u> | <u>500</u> | 39 | 50 | 906 | 87 | — | — | 94 | 180 | 320 | 170 | — | — | None |

Underline shows that it does not meet the recommended condition.

TABLE 7

| No | Hot Rolling | | | Cold Rolling | First Heat Treatment | | | | | | Second Heat Treatment | | | | | | | | | Tempering | | |
|---|---|---|---|---|---|---|---|---|---|---|---|---|---|---|---|---|---|---|---|---|---|---|
| | Heat Temp. (°C.) | Finish Temp. (°C.) | Coiling Temp. (°C.) | Rolling Reduction (%) | Heat Temp. (°C.) | Held Time (sec) | First-stage Cooling | | Cooling Rate (°C./s) | Stop Temp. (°C.) | Heat Temp. (°C.) | Held Time (sec) | First-stage Cooling | | Cooling Rate (°C./s) | Stop Temp. (°C.) | Holding Temp. (°C.) | Holding Time (sec) | Heat Temp. (°C.) | Held Time (sec) | Plating Existence |
| | | | | | | | Cooling Rate (°C./s) | Stop Temp. (°C.) | | | | | Cooling Rate (°C./s) | Stop Temp. (°C.) | | | | | | | |
| AP | 1,202 | 867 | 614 | 62 | 909 | 228 | — | — | 15 | 138 | 881 | 434 | — | — | 102 | 185 | 310 | 140 | — | — | None |
| AQ | 1,293 | 982 | 556 | 49 | 930 | 349 | — | — | 72 | 400 | 978 | 376 | — | — | 29 | 195 | 310 | 240 | — | — | None |
| AR | 1,141 | 994 | 607 | 54 | 920 | 67 | — | — | 130 | 82 | 700 | 109 | — | — | 162 | 220 | 294 | 233 | — | — | None |
| AS | 1,273 | 950 | 613 | 76 | 936 | 441 | — | — | 137 | 83 | 875 | 0 | — | — | 97 | 195 | 303 | 239 | — | — | None |
| AT | 1,189 | 967 | 687 | 60 | 964 | 174 | — | — | 151 | 116 | 909 | 113 | 0.1 | 728 | 154 | 220 | 300 | 144 | — | — | None |
| AU | 1,116 | 894 | 605 | 75 | 920 | 425 | — | — | 165 | 146 | 951 | 209 | 6 | 550 | 12 | 200 | 280 | 153 | — | — | None |
| AV | 1,129 | 876 | 554 | 69 | 951 | 43 | — | — | 61 | 103 | 984 | 178 | — | — | 25 | 200 | 291 | 119 | — | — | None |
| AW | 1,178 | 949 | 629 | 48 | 935 | 143 | — | — | 192 | 136 | 927 | 183 | — | — | 49 | 450 | 270 | 107 | — | — | None |
| AX | 1,225 | 955 | 605 | 35 | 914 | 61 | — | — | 183 | 57 | 950 | 140 | — | — | 29 | 70 | 500 | 200 | — | — | None |
| AY | 1,138 | 946 | 686 | 56 | 933 | 337 | — | — | 119 | 234 | 960 | 167 | — | — | 72 | 200 | 300 | 5 | — | — | None |
| AZ | 1,265 | 914 | 662 | 75 | 890 | 399 | — | — | 165 | 250 | 984 | 403 | — | — | 145 | 220 | 333 | 650 | — | — | None |
| BA | 1,188 | 894 | 635 | 38 | 867 | 15 | — | — | 40 | 207 | 990 | 398 | — | — | 24 | 190 | 338 | 315 | — | — | None |
| BB | 1,203 | 924 | 672 | 38 | 976 | 463 | — | — | 83 | 245 | 878 | 282 | — | — | 66 | 170 | 280 | 334 | 463 | 195 | None |
| BC | 1,247 | 898 | 599 | 46 | 992 | 258 | — | — | 183 | 73 | 922 | 267 | — | — | 75 | 225 | 250 | 310 | 233 | 618 | None |
| BD | 1,116 | 959 | 696 | 48 | — | — | — | — | — | — | 900 | 156 | — | — | 74 | 170 | 264 | 215 | — | — | None |
| BE | 1,139 | 978 | 670 | 74 | 947 | 59 | — | — | 52 | 57 | 978 | 85 | — | — | 30 | 230 | 250 | 125 | — | — | None |
| BF | 1,149 | 904 | 580 | 59 | 918 | 70 | — | — | 54 | 43 | 838 | 75 | — | — | 55 | 175 | 294 | 114 | — | — | None |
| BG | 1,266 | 905 | 635 | 35 | 852 | 77 | — | — | 43 | 35 | 960 | 53 | — | — | 37 | 220 | 290 | 269 | — | — | None |
| BH | 1,230 | 959 | 656 | 48 | 923 | 68 | — | — | 33 | 43 | 968 | 81 | — | — | 50 | 115 | 300 | 163 | — | — | None |
| BI | 1,241 | 951 | 627 | 75 | 929 | 67 | — | — | 60 | 37 | 992 | 90 | — | — | 54 | 200 | 329 | 327 | — | — | None |
| BJ | 1,233 | 950 | 607 | 45 | 895 | 32 | — | — | 57 | 55 | 945 | 62 | — | — | 48 | 135 | 380 | 303 | — | — | None |

Underline shows that it does not meet the recommended condition.

TABLE 8

| No | Hot Rolling Heat Temp. (° C.) | Hot Rolling Finish Temp. (° C.) | Hot Rolling Coiling Temp. (° C.) | Cold Rolling Rolling Reduction (%) | First Heat Treatment Heat Temp. (° C.) | First Heat Treatment Held Time (sec) | First Heat Treatment First-stage Cooling Cooling Rate (° C./s) | First Heat Treatment First-stage Cooling Stop Temp. (° C.) | First Heat Treatment Cooling Rate (° C./s) | First Heat Treatment Stop Temp. (° C.) | Second Heat Treatment Heat Temp. (° C.) | Second Heat Treatment Held Time (sec) | Second Heat Treatment First-stage Cooling Cooling Rate (° C./s) | Second Heat Treatment First-stage Cooling Stop Temp. (° C.) | Second Heat Treatment Cooling Rate (° C./s) | Second Heat Treatment Stop Temp. (° C.) | Second Heat Treatment Holding Temp. (° C.) | Second Heat Treatment Holding Time (sec) | Tempering Heat Temp. (° C.) | Tempering Held Time (sec) | Plating Existence |
|---|---|---|---|---|---|---|---|---|---|---|---|---|---|---|---|---|---|---|---|---|---|
| BK | 1,257 | 936 | 684 | 69 | 911 | 60 | — | — | 55 | 69 | 895 | 31 | — | — | 53 | 190 | 300 | 172 | — | — | None |
| BL | 1,150 | 939 | 579 | 37 | 903 | 93 | — | — | 53 | 68 | 921 | 28 | — | — | 33 | 220 | 316 | 235 | — | — | None |
| BM | 1,209 | 868 | 563 | 50 | 860 | 77 | — | — | 45 | 56 | 871 | 98 | — | — | 50 | 190 | 253 | 258 | — | — | None |
| BN | 1,152 | 974 | 591 | 40 | 925 | 60 | — | — | 31 | 50 | 931 | 37 | — | — | 44 | 180 | 352 | 347 | — | — | None |
| BO | 1,132 | 903 | 639 | 47 | 893 | 39 | — | — | 34 | 39 | 897 | 50 | — | — | 47 | 200 | 425 | 243 | — | — | None |
| BP | 1,179 | 884 | 629 | 47 | 910 | 65 | — | — | 42 | 73 | 935 | 91 | — | — | 48 | 165 | 260 | 133 | — | — | None |
| BQ | 1,165 | 943 | 622 | 65 | 867 | 73 | — | — | 49 | 62 | 967 | 58 | — | — | 44 | 185 | 276 | 189 | — | — | None |
| BR | 1,125 | 949 | 650 | 58 | 968 | 43 | — | — | 43 | 73 | 968 | 31 | — | — | 31 | 180 | 333 | 346 | — | — | None |
| BS | 1,194 | 960 | 607 | 63 | 848 | 71 | — | — | 37 | 49 | 929 | 70 | — | — | 43 | 200 | 341 | 108 | — | — | None |
| BT | 1,214 | 899 | 602 | 47 | 911 | 94 | — | — | 59 | 70 | 886 | 31 | — | — | 47 | 250 | 320 | 105 | — | — | None |
| BU | 1,241 | 940 | 584 | 41 | 904 | 46 | — | — | 59 | 63 | 915 | 40 | — | — | 43 | 170 | 294 | 297 | — | — | None |
| BV | 1,133 | 930 | 586 | 41 | 963 | 53 | — | — | 60 | 69 | 861 | 55 | — | — | 33 | 250 | 253 | 252 | — | — | None |
| BW | 1,209 | 888 | 621 | 56 | 851 | 88 | — | — | 46 | 56 | 904 | 77 | — | — | 39 | 180 | 290 | 273 | — | — | None |
| BX | 1,228 | 975 | 613 | 74 | 991 | 51 | — | — | 49 | 71 | 958 | 31 | — | — | 52 | 240 | 310 | 220 | — | — | None |
| BY | 1,251 | 877 | 672 | 37 | 941 | 85 | — | — | 53 | 66 | 860 | 84 | — | — | 33 | 195 | 300 | 217 | — | — | None |
| BZ | 1,183 | 913 | 693 | 68 | 945 | 65 | — | — | 51 | 51 | 901 | 67 | — | — | 44 | 180 | 300 | 242 | — | — | None |
| CA | 1,191 | 957 | 563 | 57 | 942 | 57 | — | — | 54 | 38 | 979 | 88 | — | — | 54 | 195 | 300 | 209 | — | — | None |
| CB | 1,161 | 974 | 687 | 75 | 860 | 41 | — | — | 59 | 57 | 892 | 57 | — | — | 49 | 185 | 200 | 129 | — | — | None |
| CC | 1,226 | 900 | 602 | 70 | 991 | 28 | — | — | 43 | 68 | 923 | 98 | — | — | 41 | 245 | 300 | 188 | — | — | None |
| CD | 1,284 | 874 | 685 | 55 | 967 | 53 | — | — | 60 | 72 | 920 | 93 | — | — | 52 | 215 | 300 | 206 | — | — | None |
| CE | 1,281 | 890 | 664 | 70 | 892 | 31 | — | — | 55 | 56 | 953 | 53 | — | — | 34 | 185 | 329 | 200 | — | — | None |
| CF | 1,132 | 875 | 619 | 51 | 933 | 62 | — | — | 31 | 50 | 950 | 21 | — | — | 51 | 225 | 280 | 112 | — | — | None |
| CG | 1,123 | 969 | 611 | 60 | 931 | 68 | — | — | 53 | 35 | 867 | 64 | — | — | 34 | 180 | 322 | 279 | — | — | None |
| CH | 1,271 | 885 | 585 | 62 | 945 | 98 | — | — | 44 | 36 | 879 | 21 | — | — | 39 | 220 | 290 | 324 | — | — | None |
| CI | 1,197 | 909 | 663 | 40 | 945 | 98 | — | — | 44 | 38 | 852 | 45 | — | — | 32 | 205 | 251 | 297 | — | — | None |
| CJ | 1,250 | 900 | 577 | 31 | 974 | 48 | — | — | 44 | 38 | 870 | 263 | — | — | 64 | 190 | 300 | 185 | — | — | None |

Underline shows that it does not meet the recommended condition.

TABLE 9

| Test No. | Steel No. | Production No. | Thickness (mm) | Volume Fraction of Microstructure (%) F | P | B | Retained γ | M | TM | Number of ≥0.1 μm radius carbides (/20000 μm²) | TS (MPa) | El (%) | Content in retained γ Mn (Mn$_A$) | C (C$_A$) | Content in matrix Mn (Mn$_M$) | C (C$_M$) | Mn$_A$/Mn$_M$ | C$_A$/C$_M$ | λ (%) | α (deg) | ① | TS × El | TS × λ | Evaluation | Remarks |
|---|---|---|---|---|---|---|---|---|---|---|---|---|---|---|---|---|---|---|---|---|---|---|---|---|---|
| 1 | 1 | A | 1.4 | — | — | 5 | 8 | — | 87 | 40 | 1,206 | 13.2 | 3.8 | 0.7 | 3.1 | 0.20 | 1.2 | 3.7 | 40 | 75 | 25 | 15,956 | 48,222 | ○ | Invention Steel |
| 2 | 2 | B | 1.4 | — | — | 4 | 8 | — | 87 | 43 | 1,186 | 13.6 | 2.0 | 0.8 | 0.8 | 0.20 | 2.5 | 3.9 | 38 | 68 | 18 | 16,156 | 45,062 | ○ | Invention Steel |
| 3 | 3 | C | 1.4 | — | — | 4 | 8 | — | 87 | 65 | 1,262 | 13.5 | 1.5 | 1.0 | 0.8 | 0.31 | 1.9 | 3.2 | 38 | 73 | 23 | 17,018 | 47,960 | ○ | Invention Steel |
| 4 | 4 | D | 1.4 | — | — | 6 | 7 | — | 87 | 32 | 1,531 | 12.7 | 2.4 | 0.8 | 1.1 | 0.33 | 2.2 | 2.3 | 38 | 65 | 15 | 19,515 | 58,191 | ○ | Invention Steel |
| 5 | 5 | E | 1.4 | — | — | 3 | 9 | — | 88 | 43 | 1,241 | 14.4 | 2.0 | 0.7 | 0.8 | 0.20 | 2.5 | 3.7 | 37 | 69 | 19 | 17,891 | 45,924 | ○ | Invention Steel |
| 6 | 6 | F | 1.2 | — | — | 3 | 9 | — | 88 | 26 | 1,171 | 14.2 | 2.3 | 0.8 | 1.4 | 0.21 | 1.7 | 4.0 | 29 | 68 | 16 | 16,602 | 33,958 | ○ | Invention Steel |
| 7 | 7 | G | 1.4 | — | — | 4 | 8 | — | 88 | 38 | 1,382 | 13.1 | 2.8 | 0.9 | 2.3 | 0.32 | 1.2 | 2.8 | 34 | 62 | 12 | 18,111 | 46,993 | ○ | Invention Steel |
| 8 | 8 | H | 1.4 | — | — | 3 | 9 | — | 88 | 25 | 1,390 | 13.9 | 1.8 | 0.8 | 1.1 | 0.28 | 1.6 | 2.8 | 33 | 65 | 15 | 19,344 | 45,878 | ○ | Invention Steel |
| 9 | 9 | I | 1.4 | — | — | 6 | 7 | — | 87 | 33 | 1,198 | 12.8 | 1.9 | 0.7 | 0.8 | 0.19 | 2.4 | 3.6 | 41 | 73 | 23 | 15,334 | 49,118 | ○ | Invention Steel |
| 10 | 10 | J | 1.4 | — | — | 4 | 8 | — | 87 | 61 | 1,464 | 13.6 | 4.0 | 0.9 | 3.2 | 0.33 | 1.2 | 2.7 | 35 | 64 | 14 | 19,883 | 51,245 | ○ | Invention Steel |
| 11 | 11 | K | 1.4 | — | — | 4 | 9 | — | 87 | 10 | 1,145 | 14.2 | 1.6 | 0.9 | 0.8 | 0.19 | 2.0 | 4.6 | 29 | 65 | 15 | 16,226 | 33,205 | ○ | Invention Steel |
| 12 | 12 | L | 1.4 | — | — | 4 | 8 | — | 87 | 30 | 1,151 | 13.6 | 1.9 | 0.8 | 0.9 | 0.20 | 2.1 | 4.0 | 30 | 66 | 16 | 15,678 | 34,533 | ○ | Invention Steel |
| 13 | 13 | M | 1.4 | — | — | 5 | 7 | — | 87 | 40 | 1,158 | 13.0 | 1.9 | 0.8 | 0.8 | 0.20 | 2.4 | 3.8 | 32 | 68 | 18 | 15,056 | 37,060 | ○ | Invention Steel |
| 14 | 14 | N | 1.4 | — | — | 6 | 7 | — | 87 | 19 | 1,192 | 12.6 | 3.9 | 0.7 | 2.9 | 0.21 | 1.3 | 3.6 | 33 | 68 | 18 | 15,019 | 39,336 | ○ | Invention Steel |
| 15 | 15 | O | 1.4 | — | — | 6 | 7 | — | 87 | 68 | 1,162 | 12.9 | 5.6 | 0.8 | 4.6 | 0.23 | 1.2 | 3.7 | 34 | 70 | 20 | 15,027 | 39,512 | ○ | Invention Steel |
| 16 | 16 | P | 1.6 | — | — | 3 | 10 | — | 87 | 10 | 1,430 | 15.1 | 3.4 | 0.9 | 2.2 | 0.32 | 1.5 | 2.9 | 42 | 65 | 16 | 21,619 | 60,078 | ○ | Invention Steel |
| 17 | 17 | Q | 1.4 | — | — | 5 | 7 | — | 88 | 14 | 1,251 | 12.5 | 1.1 | 0.8 | 0.9 | 0.25 | 1.2 | 3.2 | 36 | 64 | 14 | 15,688 | 45,020 | ○ | Invention Steel |
| 18 | 18 | R | 1.4 | — | — | 6 | 7 | — | 87 | 6 | 1,349 | 12.4 | 3.0 | 0.7 | 2.3 | 0.25 | 1.3 | 2.6 | 40 | 68 | 18 | 16,692 | 53,956 | ○ | Invention Steel |
| 19 | 19 | S | 1.4 | — | — | 4 | 8 | — | 88 | 5 | 1,189 | 13.7 | 3.5 | 0.9 | 2.8 | 0.24 | 1.2 | 3.6 | 31 | 66 | 16 | 16,246 | 36,872 | ○ | Invention Steel |
| 20 | 20 | T | 1.4 | — | — | 2 | 10 | — | 87 | 8 | 1,132 | 15.2 | 3.6 | 0.9 | 3.0 | 0.22 | 1.2 | 4.2 | 30 | 68 | 18 | 17,206 | 33,956 | ○ | Invention Steel |

The each symbol of the Microstructure means as follows: F: ferrite, P: pearlite, B: bainite, Retained γ: Retained austenite, TM: tempered martensite, M: as-quenched martensite
① means the calculated value of "α-(2.37 t² − 14 t + 65)", and the value is good if it is 0 or more.
"—" means the microstructure was not observed.

TABLE 10

| Test No. | Steel No. | Production No. | Thickness (mm) | Volume Fraction of Microstructure (%) F | P | B | Retained γ | M | TM | Number of ≥0.1 μm radius carbides (/20000 μm²) | TS (MPa) | El (%) | Content in retained γ Mn (Mn_A) | C (C_A) | Content in matrix Mn (Mn_M) | C (C_M) | Mn_A/Mn_M | C_A/C_M | λ (%) | α (deg) | ① | Crash Resistance TS × El | TS × λ | Evaluation | Remarks |
|---|---|---|---|---|---|---|---|---|---|---|---|---|---|---|---|---|---|---|---|---|---|---|---|---|---|
| 21 | 21 | U | 1.4 | — | — | 3 | 10 | — | 87 | 9 | 1,285 | 14.9 | 2.2 | 0.9 | 1.7 | 0.28 | 1.3 | 3.3 | 34 | 65 | 15 | 19,196 | 43,689 | ○ | Invention Steel |
| 22 | 22 | V | 1.4 | — | — | 6 | 7 | — | 87 | 12 | 1,210 | 12.4 | 3.3 | 0.8 | 2.6 | 0.20 | 1.3 | 4.1 | 28 | 62 | 12 | 15,055 | 33,880 | ○ | Invention Steel |
| 23 | 23 | W | 1.4 | — | — | 4 | 8 | — | 88 | 4 | 1,190 | 13.4 | 2.1 | 0.9 | 1.0 | 0.19 | 2.1 | 4.4 | 30 | 63 | 13 | 15,946 | 35,700 | ○ | Invention Steel |
| 24 | 24 | X | 1.4 | — | — | 5 | 7 | — | 88 | 10 | 1,177 | 12.9 | 3.3 | 0.7 | 2.4 | 0.19 | 1.4 | 3.8 | 34 | 68 | 18 | 15,188 | 40,004 | ○ | Invention Steel |
| 25 | 25 | Y | 1.4 | — | — | 6 | 6 | — | 87 | 14 | 1,342 | 12.1 | 2.0 | 0.7 | 1.3 | 0.28 | 1.5 | 2.7 | 38 | 70 | 20 | 16,235 | 51,015 | ○ | Invention Steel |
| 26 | 26 | Z | 1 | — | — | 7 | 6 | — | 87 | 24 | 1,333 | 11.5 | 1.5 | 0.9 | 1.0 | 0.33 | 1.5 | 2.9 | 40 | 70 | 17 | 15,390 | 53,324 | ○ | Invention Steel |
| 27 | 27 | AA | 1.4 | — | — | 7 | 6 | — | 87 | 6 | 1,437 | 11.4 | 2.3 | 0.7 | 1.8 | 0.29 | 1.3 | 2.3 | 41 | 65 | 15 | 16,363 | 58,927 | ○ | Invention Steel |
| 28 | 28 | AB | 1.4 | — | — | 7 | 6 | — | 87 | 22 | 1,488 | 11.9 | 3.7 | 0.6 | 3.0 | 0.30 | 1.2 | 2.1 | 45 | 71 | 21 | 17,690 | 66,976 | ○ | Invention Steel |
| 29 | 29 | AC | 1.4 | — | — | 6 | 7 | — | 87 | 9 | 1,296 | 12.5 | 2.3 | 1.0 | 1.8 | 0.32 | 1.3 | 3.0 | 34 | 66 | 16 | 16,149 | 44,074 | ○ | Invention Steel |
| 30 | 30 | AD | 1.4 | — | — | 7 | 6 | — | 87 | 11 | 1,357 | 11.4 | 4.3 | 0.6 | 2.9 | 0.26 | 1.5 | 2.5 | 38 | 67 | 17 | 15,517 | 51,570 | ○ | Invention Steel |
| 31 | 30 | AE | 1.4 | — | — | 7 | 6 | — | 87 | 12 | 1,357 | 11.4 | 3.6 | 0.6 | 2.9 | 0.26 | 1.2 | 2.5 | 35 | 66 | 16 | 15,517 | 47,499 | ○ | Invention Steel |
| 32 | 30 | AF | 1.4 | — | — | 7 | 6 | — | 87 | 13 | 1,357 | 11.4 | 3.7 | 0.6 | 2.9 | 0.26 | 1.3 | 2.5 | 34 | 66 | 16 | 15,517 | 46,141 | ○ | Invention Steel |
| 33 | 31 | AG | | | | | | | | | | | | It cannot be tested. | | | | | | | | | | | | Comparative Steel |
| 34 | 32 | AH | 1.4 | — | — | 6 | 7 | — | 88 | 62 | 1,152 | 12.4 | 1.8 | 0.7 | 1.8 | 0.19 | 1.0 | 3.9 | 26 | 62 | 12 | 14,270 | 29,950 | X | Comparative Steel |
| 35 | 32 | AI | | | | | | | | | | | | It cannot be tested. | | | | | | | | | | | | Comparative Steel |
| 36 | 32 | AJ | | | | | | | | | | | | It cannot be tested. | | | | | | | | | | | | Comparative Steel |
| 37 | 33 | AK | 1.4 | — | — | 7 | 6 | — | 87 | 139 | 1,167 | 11.8 | 3.2 | 1.2 | 3.1 | 0.20 | 1.0 | 4.2 | 23 | 58 | 8 | 13,737 | 26,846 | X | Comparative Steel |
| 38 | 34 | AL | 1.4 | — | — | 2 | 6 | — | 92 | 92 | 1,200 | 12.2 | 2.5 | 1.2 | 1.4 | 0.19 | 1.8 | 6.3 | 18 | 57 | 7 | 14,638 | 21,600 | X | Comparative Steel |
| 39 | 35 | AM | 1.4 | — | — | 5 | 9 | — | 86 | 108 | 1,168 | 14.3 | 3.2 | 1.1 | 2.5 | 0.20 | 1.3 | 5.2 | 28 | 65 | 15 | 16,662 | 32,711 | X | Comparative Steel |
| 40 | 36 | AN | 1.4 | — | — | 4 | 6 | — | 90 | 53 | 1,274 | 12.3 | 2.7 | 0.7 | 2.6 | 0.21 | 1.0 | 3.2 | 21 | 61 | 11 | 15,711 | 26,746 | X | Comparative Steel |

Underline shows it does not meet the claimed range, the recommended condition, or the target performance.
The each symbol of the Microstructure means as follows: F: ferrite, P: pearlite, B: bainite, Retained γ: Retained austenite, TM: tempered martensite, M: as-quenched martensite
① means the calculated value of "α-(2.37 t² − 14 t + 65)", and the value is good if it is 0 or more. "—" means the microstructure was not observed.

TABLE 11

| Test No. | Steel No. | Production No. | Thickness (mm) | Volume Fraction of Microstructure (%) F | P | B | Retained γ | M | TM | Number of ≥0.1 μm radius carbides (/20000 μm²) | TS (MPa) | El (%) | Content in retained γ Mn (Mn$_A$) | C (C$_A$) | Content in matrix Mn (Mn$_M$) | C (C$_M$) | Mn$_A$/Mn$_M$ | C$_A$/C$_M$ | λ (%) | α (deg) | ① | Crash Resistance TS × El | TS × λ | Evaluation | Remarks |
|---|---|---|---|---|---|---|---|---|---|---|---|---|---|---|---|---|---|---|---|---|---|---|---|---|---|
| 41 | 37 | AO | 1.4 | — | — | 1 | 5 | — | 94 | 17 | 1,182 | 11.5 | 1.0 | 1.0 | 0.9 | 0.20 | 1.1 | 4.9 | 18 | 68 | 18 | 13,579 | 21,272 | X | Comparative Steel |
| 42 | 38 | AP | 1.4 | — | — | 6 | 7 | 2 | 85 | 53 | 1,142 | 12.7 | 3.4 | 0.9 | 3.3 | 0.20 | 1.0 | 4.6 | 42 | 74 | 24 | 14,475 | 47,956 | X | Comparative Steel |
| 43 | 39 | AQ | 1.4 | — | — | 6 | 2 | 7 | 85 | 69 | 1,142 | 8.4 | 3.4 | 1.1 | 3.0 | 0.20 | 1.1 | 5.6 | 35 | 67 | 17 | 9,560 | 39,970 | X | Comparative Steel |
| 44 | 40 | AS | 1.4 | 30 | — | 8 | 0 | — | 62 | 57 | 1,193 | 17.0 | 2.0 | 1.1 | 1.3 | 0.19 | 1.5 | 5.7 | 17 | 78 | 28 | 20,234 | 20,282 | X | Comparative Steel |
| 45 | 41 | AT | 1.4 | 35 | — | 10 | 0 | — | 55 | 31 | 1,193 | 18.4 | 1.6 | 1.0 | 1.6 | 0.21 | 1.0 | 4.8 | 24 | 75 | 25 | 21,945 | 28,624 | X | Comparative Steel |
| 46 | 42 | AU | 1.4 | — | — | 4 | 7 | 4 | 85 | 59 | 1,177 | 12.7 | 3.8 | 1.0 | 3.0 | 0.19 | 1.3 | 5.2 | 34 | 79 | 29 | 14,910 | 40,026 | X | Comparative Steel |
| 47 | 43 | AV | 1.4 | — | 5 | 68 | 7 | — | 20 | 16 | 750 | 7.1 | 2.6 | 0.8 | 2.0 | 0.19 | 1.3 | 4.4 | 51 | 95 | 45 | 5,339 | 38,250 | X | Comparative Steel |
| 48 | 44 | AW | 1.4 | — | — | — | 5 | — | 95 | 32 | 1,273 | 11.6 | 1.5 | 1.0 | 0.9 | 0.19 | 1.7 | 5.3 | 17 | 68 | 18 | 14,764 | 21,636 | X | Comparative Steel |
| 49 | 45 | AX | 1.4 | — | — | 3 | 8 | — | 89 | 19 | 865 | 13.5 | 2.9 | 1.6 | 2.2 | 0.19 | 1.3 | 8.3 | 15 | 89 | 39 | 11,679 | 12,975 | X | Comparative Steel |
| 50 | 46 | AY | 1.4 | — | — | 1 | 0 | 13 | 86 | 56 | 1,190 | 6.9 | 2.5 | 0.2 | 2.3 | 0.20 | 1.1 | 1.2 | 41 | 85 | 35 | 8,187 | 48,790 | X | Comparative Steel |
| 51 | 47 | AZ | 1.4 | — | — | 5 | 10 | — | 85 | 87 | 1,109 | 14.8 | 3.9 | 1.9 | 2.2 | 0.21 | 1.8 | 9.1 | 22 | 67 | 17 | 16,382 | 24,400 | X | Comparative Steel |
| 52 | 48 | BA | 1.4 | — | — | 4 | 5 | — | 91 | 16 | 1,197 | 12.6 | 2.8 | 0.9 | 1.5 | 0.21 | 1.9 | 4.3 | 26 | 68 | 18 | 15,082 | 31,122 | ○ | Invention Steel |
| 53 | 49 | BB | 1.4 | — | — | 2 | 6 | — | 92 | 66 | 1,279 | 13.2 | 2.9 | 0.9 | 1.9 | 0.20 | 1.5 | 4.5 | 25 | 66 | 16 | 16,883 | 31,975 | ○ | Invention Steel |
| 54 | 50 | BC | 1.4 | — | — | 6 | 9 | 3 | 82 | 52 | 1,198 | 13.5 | 3.5 | 0.8 | 2.8 | 0.19 | 1.2 | 4.3 | 48 | 81 | 31 | 16,173 | 57,504 | ○ | Invention Steel |
| 55 | 51 | BD | 1.4 | — | — | 4 | 8 | — | 88 | 162 | 1,232 | 13.5 | 3.0 | 1.0 | 3.2 | 0.19 | 1.0 | 4.9 | 21 | 62 | 12 | 16,671 | 25,862 | X | Comparative Steel |
| 56 | 52 | BE | 1.4 | — | — | 5 | 7 | 2 | 86 | 17 | 1,043 | 12.3 | 4.7 | 0.7 | 3.1 | 0.10 | 1.5 | 6.8 | 18 | 72 | 22 | 12,811 | 18,775 | X | Comparative Steel |
| 57 | 53 | BF | 1.4 | — | — | 6 | 7 | — | 87 | 19 | 1,864 | 8.9 | 1.8 | 1.2 | 1.0 | 0.39 | 1.8 | 3.1 | 28 | 42 | −8 | 16,590 | 52,192 | X | Comparative Steel |
| 58 | 54 | BG | 1.4 | — | — | 2 | 9 | — | 89 | 18 | 1,195 | 14.5 | 2.7 | 1.1 | 1.5 | 0.19 | 1.8 | 5.7 | 17 | 42 | −8 | 17,375 | 20,309 | X | Comparative Steel |
| 59 | 55 | BH | 1.4 | — | — | 6 | 5 | 9 | 80 | 21 | 1,393 | 11.1 | 1.9 | 0.9 | 1.0 | 0.28 | 1.9 | 3.2 | 18 | 43 | −7 | 15,493 | 25,079 | X | Comparative Steel |
| 60 | 56 | BI | 1.4 | — | — | 4 | 6 | — | 90 | 18 | 1,480 | 12.0 | 0.3 | 1.3 | 0.1 | 0.32 | 3.3 | 4.1 | 14 | 40 | −10 | 17,730 | 20,714 | X | Comparative Steel |

Underline shows it does not meet the claimed range, the recommended condition, or the target performance.
The each symbol of the Microstructure means as follows: F: ferrite, P: pearlite, B: bainite, Retained γ: Retained austenite, TM: tempered martensite, M: as-quenched martensite.
① means the calculated value of "α-(2.37 t² − 14 t + 65)", and the value is good if it is 0 or more. "—" means the microstructure was not observed.

TABLE 12

| Test No. | Steel No. | Production No. | Thickness (mm) | Volume Fraction of Microstructure (%) F | P | B | Retained γ | M | TM | Number of ≥0.1 μm radius carbides (/20000 μm²) | TS (MPa) | El (%) | Content in retained γ Mn (Mn_A) | C (C_A) | Content in matrix Mn (Mn_M) | C (C_M) | Mn_A/Mn_M | C_A/C_M | λ (%) | α (deg) | ① | Crash Resistance TS × El | TS × λ | Evaluation | Remarks |
|---|---|---|---|---|---|---|---|---|---|---|---|---|---|---|---|---|---|---|---|---|---|---|---|---|---|
| 61 | 57 | BJ | 1.4 | — | — | 4 | 11 | — | 85 | 13 | 1,231 | 15.8 | 4.7 | 1.4 | 3.6 | 0.29 | 1.3 | 4.9 | 30 | 46 | −4 | 19,471 | 36,938 | X | Comparative Steel |
| 62 | 58 | BK | 1.4 | — | — | 4 | 8 | — | 88 | 9 | 1,222 | 13.3 | 3.8 | 0.8 | 2.2 | 0.29 | 1.7 | 3.5 | 19 | 52 | 2 | 16,297 | 23,217 | X | Comparative Steel |
| 63 | 59 | BL | 1.4 | — | — | 4 | 5 | — | 91 | 12 | 1,173 | 11.3 | 1.8 | 0.8 | 0.8 | 0.20 | 2.3 | 4.2 | 17 | 49 | −1 | 13,253 | 19,941 | X | Comparative Steel |
| 64 | 60 | BM | 1.4 | — | — | 4 | 9 | — | 88 | 14 | 1,520 | 9.8 | 2.1 | 0.7 | 1.0 | 0.31 | 2.1 | 2.3 | 28 | 54 | 4 | 14,896 | 42,560 | X | Comparative Steel |
| 65 | 61 | BN | 1.4 | — | — | — | 8 | — | 92 | 10 | 1,232 | 13.7 | 1.8 | 1.0 | 1.1 | 0.25 | 1.6 | 3.9 | 17 | 56 | 6 | 16,934 | 20,943 | X | Comparative Steel |
| 66 | 62 | BO | 1.4 | — | — | 5 | 9 | — | 86 | 9 | 1,298 | 11.3 | 1.2 | 1.1 | 0.8 | 0.33 | 1.5 | 3.3 | 28 | 58 | 8 | 14,668 | 36,346 | X | Comparative Steel |
| 67 | 63 | BP | 1.4 | — | — | 4 | 7 | — | 89 | 13 | 1,240 | 12.7 | 4.6 | 0.7 | 3.1 | 0.19 | 1.5 | 3.4 | 16 | 48 | −2 | 15,709 | 19,845 | X | Comparative Steel |
| 68 | 64 | BQ | 1.4 | — | — | — | 8 | — | 92 | 15 | 1,259 | 13.6 | 1.2 | 0.7 | 0.9 | 0.20 | 1.4 | 3.6 | 17 | 49 | −1 | 17,185 | 21,406 | X | Comparative Steel |
| 69 | 65 | BR | 1.4 | — | — | 3 | 11 | — | 85 | 7 | 1,130 | 15.9 | 4.5 | 0.9 | 3.2 | 0.21 | 1.4 | 4.3 | 19 | 53 | 3 | 17,944 | 21,463 | X | Comparative Steel |
| 70 | 66 | BS | 1.4 | — | — | 8 | 7 | — | 85 | 12 | 1,421 | 10.1 | 1.4 | 0.8 | 0.9 | 0.33 | 1.5 | 2.5 | 31 | 54 | 4 | 14,352 | 44,051 | X | Comparative Steel |
| 71 | 67 | BT | 1.4 | — | — | 7 | 7 | — | 86 | 9 | 1,120 | 12.4 | 1.3 | 0.8 | 0.8 | 0.20 | 1.6 | 4.0 | 19 | 48 | −2 | 13,869 | 21,276 | X | Comparative Steel |
| 72 | 68 | BU | 1.4 | — | — | 3 | 5 | — | 92 | 9 | 1,235 | 11.4 | 1.8 | 0.8 | 0.9 | 0.20 | 1.9 | 3.9 | 10 | 42 | −8 | 14,031 | 12,354 | X | Comparative Steel |
| 73 | 69 | BV | 1.4 | — | — | 4 | 8 | — | 88 | 8 | 1,243 | 13.8 | 1.6 | 0.7 | 0.9 | 0.19 | 1.7 | 3.6 | 15 | 46 | −4 | 17,155 | 18,647 | X | Comparative Steel |
| 74 | 70 | BW | 1.4 | — | — | 5 | 9 | — | 86 | 16 | 1,161 | 14.3 | 4.6 | 0.8 | 2.9 | 0.19 | 1.6 | 4.1 | 16 | 48 | −2 | 16,652 | 18,578 | X | Comparative Steel |
| 75 | 71 | BX | 1.4 | — | — | 2 | 9 | — | 89 | 9 | 1,156 | 14.1 | 1.5 | 0.8 | 0.9 | 0.19 | 1.8 | 4.2 | 13 | 48 | −2 | 16,320 | 15,033 | X | Comparative Steel |
| 76 | 72 | BY | 1.4 | — | — | — | 6 | — | 94 | 19 | 1,225 | 12.3 | 1.9 | 0.8 | 0.7 | 0.20 | 2.8 | 4.0 | 13 | 47 | −3 | 15,056 | 15,931 | X | Comparative Steel |
| 77 | 73 | BZ | 1.4 | — | — | 1 | 6 | — | 93 | 13 | 1,254 | 12.3 | 1.6 | 0.8 | 1.1 | 0.21 | 1.5 | 3.8 | 9 | 40 | −10 | 15,373 | 11,284 | X | Comparative Steel |
| 78 | 74 | CA | 1.4 | — | — | 7 | 8 | — | 85 | 16 | 1,142 | 13.5 | 4.1 | 0.8 | 3.1 | 0.19 | 1.3 | 4.0 | 19 | 54 | 4 | 15,457 | 21,689 | X | Comparative Steel |
| 79 | 75 | CB | 1.4 | — | — | 8 | 5 | — | 87 | 8 | 1,451 | 10.1 | 5.1 | 0.1 | 3.1 | 0.19 | 1.6 | 0.5 | 28 | 58 | 8 | 14,654 | 40,625 | X | Comparative Steel |
| 80 | 76 | CC | 1.4 | — | — | 5 | 8 | — | 87 | 12 | 1,207 | 13.4 | 2.1 | 0.8 | 0.9 | 0.22 | 2.3 | 3.5 | 22 | 56 | 6 | 16,179 | 26,554 | X | Comparative Steel |
| 81 | 77 | CD | 1.4 | — | — | 6 | 8 | — | 86 | 18 | 1,152 | 13.6 | 4.2 | 0.8 | 2.3 | 0.20 | 1.8 | 4.0 | 20 | 54 | 4 | 15,657 | 23,049 | X | Comparative Steel |

TABLE 12-continued

| Test No. | Steel No. | Production No. | Thickness (mm) | Volume Fraction of Microstructure (%) F | P | B | Retained γ | M | TM | Number of ≥0.1 μm radius carbides (/20000 μm²) | TS (MPa) | El (%) | Content in retained γ Mn (Mn_A) | C (C_A) | Content in matrix Mn (Mn_M) | C (C_M) | Mn_A/Mn_M | C_A/C_M | λ (%) | α (deg) | ① | Crash Resistance TS × El | TS × λ | Evaluation | Remarks |
|---|---|---|---|---|---|---|---|---|---|---|---|---|---|---|---|---|---|---|---|---|---|---|---|---|---|
| 82 | 78 | CE | 1.4 | — | — | — | 6 | — | 94 | 9 | 1,178 | 12.3 | 1.9 | 0.8 | 0.9 | 0.20 | 2.1 | 4.2 | 14 | 48 | −2 | 14,488 | 16,494 | X | Comparative Steel |
| 83 | 79 | CF | 1.4 | — | — | 4 | 7 | — | 89 | 8 | 1,218 | 12.5 | 2.5 | 0.7 | 1.2 | 0.20 | 2.1 | 3.5 | 19 | 51 | 1 | 15,256 | 23,139 | X | Comparative Steel |
| 84 | 80 | CG | 1.4 | — | — | 4 | 10 | — | 86 | 11 | 1,433 | 10.2 | 3.0 | 0.9 | 1.7 | 0.31 | 1.8 | 2.7 | 28 | 56 | 6 | 14,618 | 40,128 | X | Comparative Steel |
| 85 | 81 | CH | 1.4 | — | — | 1 | 10 | — | 89 | 17 | 1,269 | 12.3 | 1.7 | 0.7 | 1.1 | 0.23 | 1.5 | 3.6 | 19 | 45 | −5 | 15,607 | 24,108 | X | Comparative Steel |
| 86 | 82 | CI | 1.4 | — | — | 6 | 9 | — | 85 | 18 | 1,543 | 9.6 | 1.6 | 0.7 | 0.9 | 0.33 | 1.8 | 2.2 | 31 | 53 | 3 | 14,813 | 47,833 | X | Comparative Steel |
| 87 | 1 | CJ | 2.4 | — | — | 6 | 9 | — | 85 | 173 | 1,203 | 13.2 | 3.8 | 0.7 | 3.1 | 0.20 | 1.2 | 3.7 | 18 | 57 | 12 | 15,880 | 21,654 | X | Comparative Steel |
| 88 | 1 | AR | 1.4 | 82 | 18 | — | — | — | — | 320 | 832 | 17.2 | — | — | 3.1 | 0.2 | — | — | 43 | 102 | 52 | 14,310 | 35,776 | X | Comparative Steel |

Underline shows it does not meet the claimed range, the recommended condition, or the target performance.

The each symbol of the Microstructure means as follows:

F: ferrite, P: pearlite, B: bainite, Retained γ: Retained austenite, TM: tempered martensite, M: as-quenched martensite ① means the calculated value of "α−(2.37 t² − 14 t + 65)", and the value is good if it is 0 or more.

"—" means the microstructure was not observed.

As shown in Tables 9 to 12, Test Nos. 1 to 32, which satisfied the definition according to the present invention, had high strength and excellent crash resistance. In contrast, Test Nos. 33 to 88, which did not satisfy any one or more of the steel micro-structure, the chemical composition, the macro hardness, and the micro hardness according to the present invention, were poor at least in crash resistance.

INDUSTRIAL APPLICABILITY

According to the present invention, a steel sheet that has high strength (specifically a tensile strength of 1100 MPa or more), high workability, and excellent crash resistance is obtained.

The invention claimed is:

1. A steel sheet including a steel micro-structure containing, in volume fraction,
tempered martensite: 85% or more, retained austenite: 5% or more to less than 15%, and ferrite, pearlite, bainite, and as-quenched martensite being less than 10% in total,
a chemical composition of the steel sheet consisting of, in mass %:
C: 0.18% or more to 0.38% or less,
Si: 0.80% or more to 2.50% or less,
Mn: 0.6% or more to 5.0% or less,
P: 0.0200% or less,
S: 0.0200% or less,
N: 0.0200% or less,
O: 0.0200% or less,
Al: 0% or more to 1.000% or less,
Cr: 0% or more to 2.0% or less,
Mo: 0% or more to 0.50% or less,
Ti: 0% or more to 0.10% or less,
Nb: 0% or more to 0.10% or less,
B: 0% or more to 0.0100% or less,
V: 0% or more to 0.50% or less,
Cu: 0% or more to 0.50% or less,
W: 0% or more to 0.100% or less,
Ta: 0% or more to 0.100% or less,
Ni: 0% or more to 1.00% or less,
Co: 0% or more to 0.50% or less,
Sn: 0% or more to 0.050% or less,
Sb: 0% or more to 0.050% or less,
As: 0% or more to 0.050% or less,
Mg: 0% or more to 0.050% or less,
Ca: 0% or more to 0.050% or less,
Y: 0% or more to 0.050% or less,
Zr: 0% or more to 0.050% or less,
La: 0% or more to 0.050% or less,
Ce: 0% or more to 0.050% or less, and
the balance: Fe and unavoidable impurities,
when a content of Mn and a content of C in the retained austenite are denoted by $Mn_A$ and $C_A$, respectively, and when a content of Mn and a content of C in a matrix are denoted by $Mn_M$ and $C_M$, respectively, following Formulas (1) to (3) are satisfied, and
when a region measuring 20000 μm² and centered about a t/4 point (t denotes a thickness of the steel sheet) from a surface of the steel sheet is observed, the number of carbides having an equivalent circle radius of 0.1 μm or more is 100 or less, and the steel sheet has a tensile strength of 1100 MPa or more, $$Mn_A/Mn_M \geq 1.2 \quad (1)$$

$$C_A/C_M \leq 5.0 \quad (2)$$

$$C_A \leq 1.0 \quad (3).$$

2. The steel sheet according to claim 1 including a galvanized layer, a galvannealed layer, or an electrogalvanized layer on its surface.

3. A steel sheet including a steel micro-structure containing, in volume fraction,
tempered martensite: 85% or more, retained austenite: 5% or more to less than 15%, and ferrite, pearlite, bainite, and as-quenched martensite being less than 10% in total,
a chemical composition of the steel sheet comprising in mass %:
C: 0.18% or more to 0.38% or less,
Si: 0.80% or more to 2.50% or less,
Mn: 0.6% or more to 5.0% or less,
P: 0.0200% or less,
S: 0.0200% or less,
N: 0.0200% or less,
O: 0.0200% or less,
Al: 0% or more to 1.000% or less,
Cr: 0% or more to 2.0% or less,
Mo: 0% or more to 0.50% or less,
Ti: 0% or more to 0.10% or less,
Nb: 0% or more to 0.10% or less,
B: 0% or more to 0.0100% or less,
V: 0% or more to 0.50% or less,
Cu: 0% or more to 0.50% or less,
W: 0% or more to 0.100% or less,
Ta: 0% or more to 0.100% or less,
Ni: 0% or more to 1.00% or less,
Co: 0% or more to 0.50% or less,
Sn: 0% or more to 0.050% or less,
Sb: 0% or more to 0.050% or less,
As: 0% or more to 0.050% or less,
Mg: 0% or more to 0.050% or less,
Ca: 0% or more to 0.050% or less,
Y: 0% or more to 0.050% or less,
Zr: 0% or more to 0.050% or less,
La: 0% or more to 0.050% or less,
Ce: 0% or more to 0.050% or less, and
the balance: Fe and unavoidable impurities,
when a content of Mn and a content of C in the retained austenite are denoted by $Mn_A$ and $C_A$, respectively, and when a content of Mn and a content of C in a matrix are denoted by $Mn_M$ and $C_M$, respectively, following Formulas (1) to (3) are satisfied, and
when a region measuring 20000 μm² and centered about a t/4 point (t denotes a thickness of the steel sheet) from a surface of the steel sheet is observed, the number of carbides having an equivalent circle radius of 0.1 μm or more is 100 or less, and the steel sheet has a tensile strength of 1100 MPa or more, $$Mn_A/Mn_M \geq 1.2 \quad (1)$$

$$C_A/C_M \leq 5.0 \quad (2)$$

$$C_A \leq 1.0 \quad (3).$$

* * * * *